United States Patent
Bolle et al.

(10) Patent No.: US 11,895,502 B2
(45) Date of Patent: Feb. 6, 2024

(54) METHODS, COMMUNICATION DEVICE AND NODES FOR ENABLING HANDLING OF DATA PACKETS IN A WIRELESS COMMUNICATION SYSTEM

(71) Applicant: Telefonaktiebolaget LM Ericsson (publ), Stockholm (SE)

(72) Inventors: Aldo Bolle, Västra Frölunda (SE); Paul Schliwa-Bertling, Ljungsbro (SE); Magnus Hurd, Stockholm (SE); Henrik Normann, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 46 days.

(21) Appl. No.: 17/776,132

(22) PCT Filed: Nov. 27, 2020

(86) PCT No.: PCT/EP2020/083658
§ 371 (c)(1),
(2) Date: May 11, 2022

(87) PCT Pub. No.: WO2021/105377
PCT Pub. Date: Jun. 3, 2021

(65) Prior Publication Data
US 2022/0400381 A1 Dec. 15, 2022

Related U.S. Application Data

(60) Provisional application No. 62/941,969, filed on Nov. 29, 2019.

(51) Int. Cl.
*H04W 12/122* (2021.01)
*H04W 12/106* (2021.01)
*H04W 28/02* (2009.01)

(52) U.S. Cl.
CPC ....... *H04W 12/122* (2021.01); *H04W 12/106* (2021.01); *H04W 28/0268* (2013.01)

(58) Field of Classification Search
CPC ........... H04W 12/122; H04W 28/0268; H04W 12/106
See application file for complete search history.

(56) References Cited

U.S. PATENT DOCUMENTS 10,057,170 B2 * 8/2018 Kumar ................ H04L 43/0882
10,178,026 B2 * 1/2019 Ma .......................... H04L 43/20
(Continued)

OTHER PUBLICATIONS

International Search Report and Written Opinion of the International Searching Authority for PCT International Application No. PCT/EP2020/083658 dated Feb. 11, 2021.
(Continued)

*Primary Examiner* — Viral S Lakhia
(74) *Attorney, Agent, or Firm* — Sage Patent Group

(57) ABSTRACT

The present disclosure relates to a method performed by a core network node for enabling handling of data packets in a wireless communication system. The core network node identifies a potentially malicious service data flow associated with a communication device. The core network node assigns, to the potentially malicious service data flow, an identifier value to an identifier. The identifier value indicates that data packets associated with the potentially malicious service data flow should be handled according to a packet handling rule for potentially malicious data packets. The core network node provides an identifier comprising the identifier value towards the communication device towards at least one of an access node that serves the communication device in the access network, and a second core network node that processes data packets to and from the communication device.

13 Claims, 18 Drawing Sheets

(56) References Cited

U.S. PATENT DOCUMENTS

| | | | |
|---|---|---|---|
| 10,986,039 B2* | 4/2021 | Sufleta | H04L 49/30 |
| 11,419,009 B2* | 8/2022 | Kainulainen | H04W 76/27 |
| 11,483,341 B2* | 10/2022 | Wei | H04W 12/12 |
| 2019/0253917 A1 | 8/2019 | Dao | |
| 2020/0178112 A1* | 6/2020 | Youn | H04W 8/02 |
| 2021/0092153 A1* | 3/2021 | Wei | H04L 45/64 |

OTHER PUBLICATIONS

Huawei et al., "Editorial correction in Solution#12," S3-192967, 3GPP TSG SA WG3 (Security) Meeting #96, Wroclaw, Poland, Aug. 26-30, 2019, 3 pages.

3GPP TR 33.861 V1.4.0, "3rd Generation Partnership Project; Technical Specification Group Services and System Aspects; Study on evolution of Cellular IoT security for the 5G System; (Release 16)," Oct. 2019, 65 pages.

3GPP TR 33.861 V1.3.0, "3rd Generation Partnership Project; Technical Specification Group Services and System Aspects; Study on evolution of Cellular IoT security for the 5G System (Release 16)," Aug. 2019, 61 pages.

3GPP TS 38.331 V15.6.0, "3rd Generation Partnership Project; Technical Specification Group Radio Access Network; NR; Radio Resource Control (RRC) protocol specification (Release 15)," Jun. 2019, 519 pages.

3GPP TS 38.300 V15.7.0, "3rd Generation Partnership Project; Technical Specification Group Radio Access Network; NR; NR and NG-RAN Overall Description; Stage 2 (Release 15)," Sep. 2019, 99 pages.

3GPP TS 23.501 V16.2.0, "3rd Generation Partnership Project; Technical Specification Group Services and System Aspects; System Architecture for the 5G System (5GS); Stage 2 (Release 16)," Sep. 2019, 391 pages.

3GPP TS 23.502 V16.2.0, "3rd Generation Partnership Project; Technical Specification Group Services and System Aspects; Procedures for the 5G System (5GS); Stage 2 (Release 16)," Sep. 2019, 525 pages.

* cited by examiner

METHODS, COMMUNICATION DEVICE AND NODES FOR ENABLING HANDLING OF DATA PACKETS IN A WIRELESS COMMUNICATION SYSTEM

CROSS REFERENCE TO RELATED APPLICATIONS

This application is a 35 U.S.C. § 371 national stage application of PCT International Application No. PCT/EP2020/083658 filed on Nov. 27, 2020, which claims the benefit of U.S. Provisional Patent Application Ser. No. 62/941,969, filed on Nov. 29, 2019, the disclosures and content of which are incorporated by reference herein in their entireties.

TECHNICAL FIELD

The present disclosure relates generally to a core network node, a method performed by the core network node, an access node, a method performed by the access node, a communication device and a method performed by the communication device. More particularly, the present disclosure relates to enabling handling of data packets in a wireless communication system. The present disclosure also relates generally to communications, and more particularly, to wireless communications and related wireless devices and network nodes.

BACKGROUND

A simplified wireless communication system 101 is illustrated in FIG. 1a. The wireless communication system 101 comprises a communication device 100 that communicates with one or more access nodes 300 using connections 107, 108. The access nodes 300 are connected to a core network node 200. The access nodes 300 are part of an access network 320. The access network 320 may be a radio access network. The communication device 100 may be a UE. The connections 107, 108 may be radio connections.

For wireless communication systems 101 pursuant to a Third Generation Partnership Project (3GPP) Evolved Packet System (EPS), also referred to as Long Term Evolution (LTE) or Fourth Generation (4G), the access nodes 300 correspond typically to an Evolved NodeB (eNB) and the core network node 200 corresponds typically to either a Mobility Management Entity (MME) and/or a Serving Gateway (SGW). The eNB is part of the access network 320, which in this case is the E-UTRAN (Evolved Universal Terrestrial Radio Access Network), while the MME and SGW are both part of the Evolved Packet Core (EPC) network.

For wireless communication systems 101 pursuant to the 3GPP Fifth Generation (5G) System (5GS), also referred to as New Radio (NR) or 5G, the access nodes 300 correspond typically to a 5G NodeB (gNB) and the core network node 200 corresponds typically to either an Access and Mobility Management Function (AMF) and/or a User Plane Function (UPF). The gNB is part of the access network 320, which in this case is the Next Generation Radio Access Network (NG-RAN), while the AMF and UPF are both part of the 5G Core Network (5GC).

The 5G system comprises the access network 320 and the core network. The access network 320 is the network that allows the communication device 100 to gain connectivity to the core network, e.g. the access node 300 which could be a base station such as a gNB or an ng-eNB in 5G. The core network comprises all the Network Functions (NF) ensuring a wide range of different functionalities such as session management, connection management, charging, authentication, etc.

FIG. 1b illustrates various network functions of the 5GC architecture. The user plane function (UPF) 110 provides a gateway between the access network 320 and an external Data Network (DN) 112, such as the Internet. The UPF 110 is responsible for data packet routing and forwarding, data packet inspection, quality of service handling, data packet filtering and traffic measurements.

The Session Management Function (SMF) 113 handles IP address allocation for the communication device 100 and controls policy enforcement. The Access and Mobility management Function (AMF) 115 handles control signaling between the core network and the communication device 100, along with security for user data and authentication. The signaling interface between the AMF 115 and the communication device 100 is sometimes referred to as the Non-Access Stratum (NAS) as distinguished from the Access Stratum (AS), which refers to the signaling interface between the communication device 100 and the access network 320.

The Policy Control Function (PCF) 118 is responsible for maintaining policy rules that govern access to the network. The Unified Data Management (UDM) 120 function stores authentication credentials and is responsible for access authorization. Other core network functions comprise the Network Exposure Function (NEF) 123, the Authentication Server Function (AUSF) 125, the Application Function (AF) 128, the NR Repository Function (NRF) 130 and the Network Slice Selection Function (NSSF) 133.

The core network functions can be implemented in many ways. For example, the core network functions can be implemented in a single physical node, can be distributed across multiple physical nodes, can be executed on a cloud platform, or a combination of cloud and physical platforms.

There is currently interest in improving the security aspects of the Cellular Internet of Things (CIoT) features in the 5G system. A key issue to be addressed is the gNB Protection from CIoT Denial of Service (DoS) attacks. A DoS attack may be described as an attack which deny service to valid users—for example, by making a Web server temporarily unavailable or unusable. With the rapid growth of CIoT, there will be a massive number Internet of Things (IoT) devices connected to and comprised in the 5G system. The IoT ecosystem is concerned that there is considerable high risk of large-scale service interruption due to possible CIoT DoS attacks. In addition, many IoT device developers are primarily concerned with CIoT devices internet functions rather than security. Not only that but some IoT device manufactures do not even have secure production environment. These factors may introduce a large number of IoT devices with very weak security capabilities. Furthermore, most of IoT devices will be deployed in unmanned places where attackers can easily access and utilized these IoT devices to launch DoS attacks against the network.

The access node 300, e.g. a gNB, is the first gate for CIoT devices in a 3GPP network; it faces serious threat of DoS attacks and it should provide solid security mechanism to identify and prevent DoS attacks from CIoT devices.

In IoT scenarios, many IoT devices will be deployed densely such as smart meters and shared bicycles. Attackers can hijack these IoT devices which are deployed approximately in same location to launch DoS attack on the control/user plane against the gNB by sending a large number of bogus data packets to the access node 300. This attack could exhaust access node resources, thus it cannot provide its fundamental function of internet access.

The Radio Resource Control (RRC) signaling exchanged before AS security activation can be used maliciously to perform a DoS attack on the access node 300. For example, attackers may compromise a large number of IoT devices and cause the IoT devices to send access request messages repeatedly. The sending of a massive number of Random Access messages to an access node 300 in a short time may occupy available preambles, which can cause other normal IoT devices to fail to access the access node 300. An attacker may also construct malicious RRC signaling to attack the access node 300.

After AS security activation, IoT devices can be used maliciously to send a large number of signaling or user plane packets to the access node 300, for example, send massive RRC signaling or User Plane (UP) data such as, RRC re-establishment/RRC resume/User plane packets, etc., to cause the access node 300 to exhaust its resources and make the access node 300 deny service to legitimate users, e.g. communication devices 100.

In the current 5GS system, user plane data is associated to Quality of Service (QoS) Flows. Each QoS Flow is identified by a QoS Flow Identifier (QFI), and the forwarding of the data packets belonging to a QoS flow is characterized by QoS parameters comprising a 5G QoS Identifier (5QI) value provided by the SMF 113 to the gNB that indicates some QoS characteristics.

The association of the data packets to QoS flows is done by the UPF 110 and the communication device 100. In the UpLink (UL), the communication device 100 classifies UL data packets based on a QoS rule that comprises packet filters and the QFI. In the DownLink (DL), the UPF 110 classifies the DL data packets in a similar way, allowing the access node 300 to schedule the resources shared by all QoS flows.

In the event that a large number of communication devices 100 simultaneously send malicious data packets in a specific cell, some of the UP shared resources may be depleted regardless of the QoS parameters of the QoS flows. In the DL, malicious data packets, if identified, can be stopped at the UPF 110. However, in the UL, all user plane data packets are delivered by the communication device 100 to the access node 300 regardless of the QoS Flow classification.

In addition to the UP congestion scenario described above, communication devices 100 having data to send while in IDLE or RRC inactive state will make use of the Random Access channel to establish the RRC connection, regardless of the QoS Flow the data belongs to. A method for avoiding or moderating a communication device 100 to initiate RRC signaling when an application generates malicious data packets is needed.

Several solutions have been proposed. In particular, a solution proposes to make use of an explicit indication to the communication device 100 requesting the communication device 100 to drop the traffic associated to a dynamically assigned QFI value. This solution may require the modification of existing procedures with the addition of new information elements and may impact the communication device 100 architecture by introducing a function separate from the existing QoS framework.

The current solution focuses on discarding the DDoS data packet in communication device side based on the instruction from network side. The network side of the solution assumes that the detection capability, security decision making capability and their logic are already in place and exist.

The Detection Function (DF) collects the communication device 100 and network activities to detect abnormal communication devices 100 and their behaviors, e.g. potentially substantial increase of traffic compared to known trends or usage of the IoT device. For example, the DF can be the Network Data Analytics Function (NWDAF). Based on the obtained report from DF, the Security Function (SF) makes a decision to mitigate against the attack by instructing the PCF 118 to create packet filter and deliver it to the communication device 100. If a data packet matches rules defined in the filter, the data packet is regarded as a malicious data packet and discarded at the communication device side.

A dynamic data packet filtering delivery method to mitigate DDoS attack according to this approach is depicted in FIG. 2. As shown therein, the SF 135 sends a detection report request to the DF 138 (step 201), and the DF 138 responds to the request with a report, e.g. a detection report response (step 202). Based on the report, the SF 135 make decisions and creates instructions (step 203). The SF 135 then sends the instructions to the PCF 118, e.g. a Nnwdaf_AnalyticsSubscription_Notify message comprising instructions (step 204). The instructions contain the wireless device_ID, exception ID, exception level, and exception trend, which indicates an analysis result based on detection. For example, the SF 135 may instruct to block the data transmissions between communication device 100 and target IP if the DoS attack is detected.

The PCF 118 creates packet filters and a 5GI value based on obtained instruction and/or local policy (step 205) and sends packet filter(s) and an explicit indicator to the communication device 100, which indicates that these packet filters are used for discarding the data packets (steps 206-208). In particular, the PCF 118 sends a Npcf_SMPolicy-Control_Update message comprising the packet filter and the indicator to the SMF 113 (step 206). The SMF 113 sends a Namf_Communication_N1N2MessageTransfer message comprising the packet filter and the indicator to the AMF 115 (step 207). The AMF 115 sends a NAS message comprising the packet filter and the indicator to the communication device 100 (step 208). The communication device 100 obtains and stores packet filters and indicator. If the data packet, e.g. the uplink data, matches with the packet filters, the communication device 100 discard, e.g. drops, the data packet(s) (step 209).

In the currently standardized QoS framework, the 5QI value is sent to the communication device 100 only for dynamically assigned QR values. The 5QI value is not used by the communication device 100 for any specific purpose in the current QoS framework. The communication device 100 only applies rules based on OH values. Thus, using an explicit indicator or a non-standardized 5QI value as in current solutions would therefore have a large impact on the communication device architecture and on the QoS framework.

Therefore, there is a need to at least mitigate or solve this issue.

SUMMARY

An objective is to obviate at least one of the above disadvantages and to improve handling of data packets in the wireless communication system.

According to a first aspect, the objective is achieved by a method performed by a core network node for enabling handling of data packets in a wireless communication system. The core network node being comprised in a core network of the wireless communication system. The core network node identifies a potentially malicious service data flow associated with a communication device served by an access network of the wireless communication system. The core network node assigns, to the potentially malicious service data flow, an identifier value to an identifier that indicates that data packets associated with the potentially malicious service data flow should be handled according to a packet handling rule for potentially malicious data packets. The core network node provides the identifier comprising the identifier value towards the communication device towards at least one of an access node that serves the communication device in the access network, and a second core network node that processes data packets to and from the communication device.

According to a second aspect, the objective is achieved by core network node for enabling handling of data packets in a wireless communication system. The core network node is comprised in a core network of the wireless communication system. The core network node is configured to identify a potentially malicious service data flow associated with a communication device served by an access network of the wireless communication system. The core network node is configured to assign, to the potentially malicious service data flow, an identifier value to an identifier that indicates that data packets associated with the potentially malicious service data flow should be handled according to a packet handling rule for potentially malicious data packets. The core network node is configured to provide the identifier comprising the identifier value towards the communication device, towards at least one of an access node that serves the communication device in the access network, and a second core network node that processes data packets to and from the communication device.

According to a third aspect, the objective is achieved by a method performed by an access node for enabling handling of data packets in a wireless communication system. The access node is comprised in an access network of the wireless communication system. The access node obtains, from a core network node, an identifier comprising an identifier value that indicates that data packets associated with a potentially malicious service data flow should be handled according to a packet handling rule for potentially malicious data packets. The access node obtains a data packet that is marked with the identifier value. The access node handles the data packet according to the packet handling rule for potentially malicious data packets.

According to a fourth aspect, the objective is achieved by an access node for enabling handling of data packets in a wireless communication system. The access node is comprised in an access network of the wireless communication system. The access node is configured to obtain, from a core network node, an identifier comprising an identifier value that indicates that data packets associated with a potentially malicious service data flow should be handled according to a packet handling rule for potentially malicious data packets. The access node is configured to obtain a data packet that is marked with the identifier value, and to handle the data packet according to the packet handling rule. According to a fifth aspect, the objective is achieved by a method performed by a communication device for enabling handling of data packets in a wireless communication system. The communication device is comprised in the wireless communication system and is served by an access network of the wireless communication system. The communication device obtains an identifier comprising an identifier value that indicates that data packets associated with a potentially malicious service data flow should be handled according to a packet handling rule for potentially malicious data packets. The wireless device obtains a data packet from an application in the communication device for uplink transmission. The wireless device determines that the data packet belongs to the potentially malicious service data flow and handles the data packet according to the packet handling rule for potentially malicious data packets.

According to a sixth aspect, the objective is achieved by a communication device for enabling handling of data packets in a wireless communication system. The communication device is comprised in the wireless communication system. The communication device is configured to obtain an identifier comprising an identifier value that indicates that data packets associated with a potential malicious service data flow should be handled according to a packet handling rule for potentially malicious data packets. The communication device is configured to obtain a data packet from an application in the communication device for uplink transmission. The communication device is configured to determine that the data packet belongs to the potential malicious service data flow, and to handle the data packet according to the packet handling rule for potentially malicious data packets.

Thanks to the identifier comprising identifier value and the packet handling rule, it is possible to detect potential malicious service data flows and take appropriate actions in order to protect the wireless communication system from e.g. DoS attacks. Consequently, the handling of data packets in the wireless communication system is improved.

The present disclosure herein affords many advantages, of which a non-exhaustive list of examples follows:

An advantage of the present disclosure is that malicious UL data packets generated by applications in a compromised communication device may be discarded and may improve protection against DoS attacks to user plane and signaling resources in the access node. A communication device may be prevented from initiating RRC signaling when an application generates malicious data packets.

Another advantage of the present disclosure is that it may offer an intermediate option where the access node is alerted when there is a potentially malicious QoS flow being mapped to the special QFI=Alert. The core network nodes may take appropriate actions. For the access node this may be especially convenient, since it may base its actions based on information all aligned, e.g. synchronized, with the higher-layer view on the QoS flow, information which is not otherwise easily transferred to the access node.

A further advantage of the present disclosure is that it may have minimal or no impact on existing signaling mechanisms, because they can reuse existing signaling mechanisms and the existing QoS framework. No new mechanisms may be needed to handle malicious communication devices upon detection.

An advantage of the present disclosure may be that it may allow for a finer granularity of action, as they may handle data at a flow level and not just PDU level. This means that other flows within a PDU session may continue to operate as normal, if the malicious data packets are dropped or discarded in the communication device and core network node. Another advantage of the present disclosure may be that it may be beneficial for the access node, which does not have to rely on any kind of temporary ID provided by the communication device.

Another advantage of the present disclosure may be that a communication device having obtained the QoS Rule indicating that it should drop data packets may remain silent, and the rule may reduce and prevent battery drainage due to radio activity stimulated by an application behaving maliciously. Many communication devices, e.g. CIoT devices, are deployed with a battery that is designed to last for its entire life as the communication device is only supposed to send small amounts of data at long intervals. With the packet filter in place, an attacker may be impeded from draining the battery of the communication device by generating large amounts of data to be provided, e.g. transmitted, as the data packets will be dropped and no signaling will be initiated.

The present disclosure is not limited to the features and advantages mentioned above. A person skilled in the art will recognize additional features and advantages upon reading the following detailed description.

BRIEF DESCRIPTION OF THE DRAWINGS

The present disclosure will now be described in more detail by way of example only in the following detailed description by reference to the appended drawings in which.

The drawings are not necessarily to scale, and the dimensions of certain features may have been exaggerated for the sake of clarity. Emphasis is instead placed upon illustrating the principle.

DETAILED DESCRIPTION

Figure 1A:
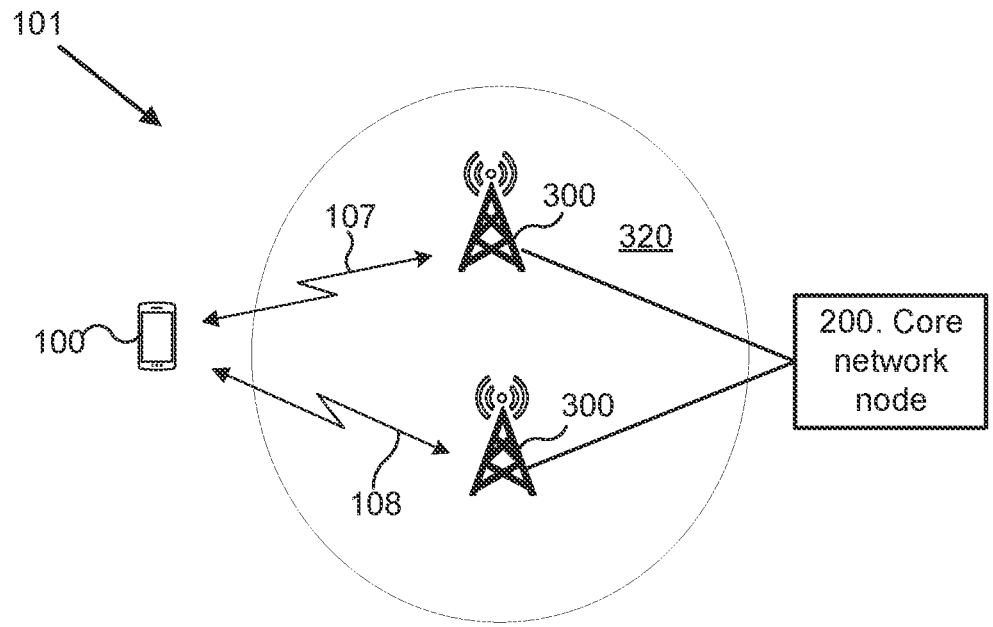
FIG. 1a illustrates a wireless communication system.
Figure 1B:
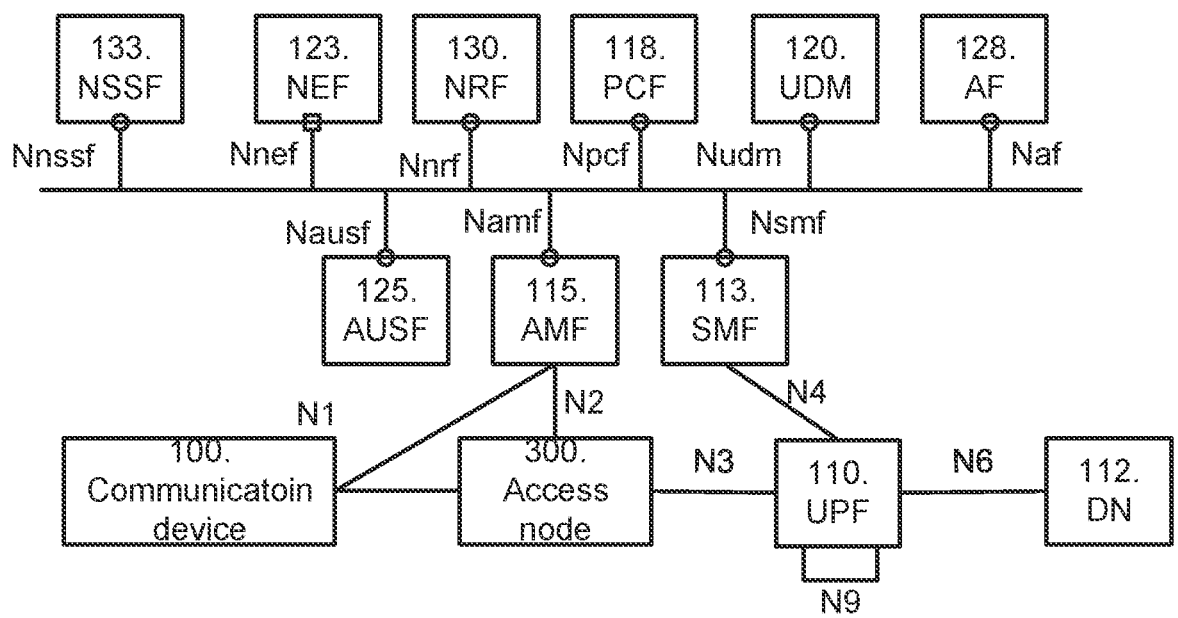
FIG. 1b illustrates a 5G wireless communication system.
Figure 2:
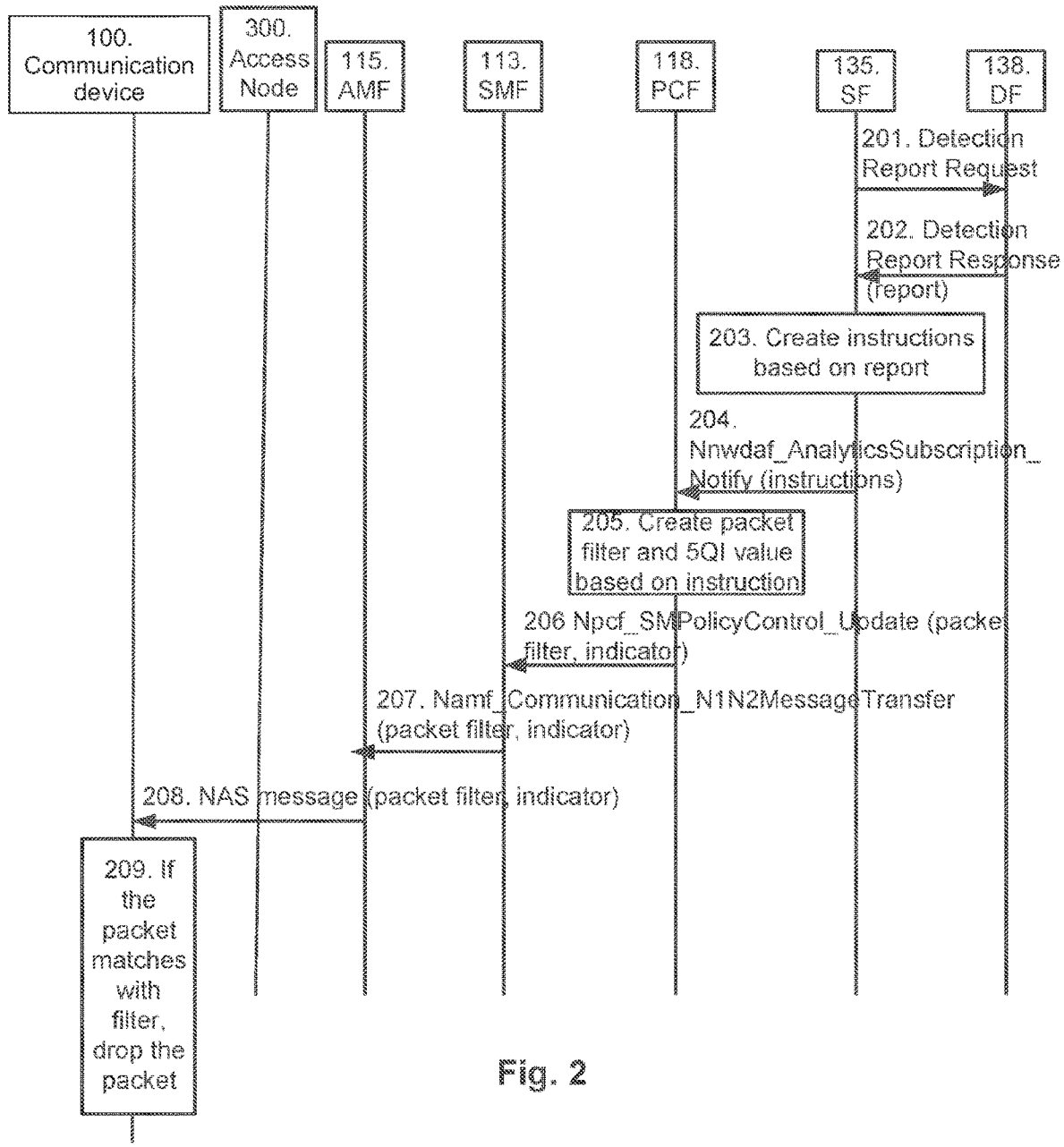
FIG. 2 is a flow diagram that illustrates a proposed approach for mitigating denial of service attacks in a 5G system.

The wireless communication system 101 described above with reference to FIG. 1a will now be described in more detail. The wireless communication system 101 may be referred to as a communication system, a wireless system, a wireless communications network, cellular radio system, or cellular network, in which the present disclosure may be implemented. The wireless communications system 101 may be a 5G system, 5G network, NR-U or Next Gen system or network. The wireless communications system 101 may alternatively be a younger system or older system than a 5G system, such as e.g. a 2G system, a 3G system, a 4G system, a 6G system a 7G system etc. The wireless communications system 101 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, NB-IoT. Thus, although terminology from 5G/NR and LTE may be used in this disclosure to exemplify, this should not be seen as limiting to only the aforementioned systems.

As mentioned above, the wireless communication system 101 comprises a communication device 100 that communicates with one or more access nodes 300 using radio connections 107, 108. The access nodes 300 are connected to a core network node 200. The access network 320 may be referred to as an Access Network (AN) or a radio access network, and these terms may be used interchangeably herein. The core network node 200 is comprised in a Core Network (CN). The access nodes 300 are part of an access network 320. Note that two access nodes 300 are shown as an example in FIG. 1a, but that any other suitable n number of access nodes 300 may be part of the access network 320, where n is a positive integer.

Any of the access nodes 300 may be a radio network node or a RAN node such as a radio base station, or any other network node with similar features capable of serving the communication device 100 in the wireless communications system 101. One access node 300 may be an eNB and the other access node 300 may be a gNB. Both access nodes 300 may be an eNB. Both access nodes 300 may be a gNB. One access node 300 may be a MeNB and the other access node 300 may be a gNB. Any of the access nodes 300 may be co-localized, or they may be part of the same access node. One of the access nodes 300 may be referred to as a source node or source network node, whereas the other access node 300 may be referred to as a target node or target network node.

The wireless communications system 101 covers a geographical area which may be divided into cell areas, wherein each cell area may be served by an access node 300, although, one access node 300 may serve one or several cells. A cell is a geographical area where radio coverage is provided by the access node 300 at an access node site.

Each cell is identified by an identity within the local network node area, which is broadcast in the cell. Any of the access nodes 300 may be of different classes, such as, e.g., macro base station (BS), home BS or pico BS, based on transmission power and thereby also cell size. Any of the access nodes 300 may be directly connected to one or more core networks. Any of the access nodes 300 may be a distributed node, such as a virtual node in the cloud, and it may perform its functions entirely on the cloud, or partially, in collaboration with another access node 300.

One or a plurality of communication devices 100 is comprised in the wireless communication system 101. Only one communication device 100 is exemplified in FIG. 1a for the sake of simplicity. A communication device 100 may also be referred to simply as a device. The communication device 100, e.g. a LTE UE or a 5G/NR UE, may be a wireless communication device which may also be known as e.g., a UE, a wireless device, a mobile terminal, wireless terminal and/or mobile station, a mobile telephone, cellular telephone, or laptop with wireless capability, just to mention some examples. The communication device 100 may be a device by which a subscriber may access services offered by an operator's network and services outside operator's network to which the operator's access network 320 and core network provide access, e.g. access to the Internet. The communication device 100 may be any device, mobile or stationary, enabled to communicate over a radio channel in the wireless communications system 101, for instance but not limited to e.g. UE, mobile phone, smart phone, sensors, meters, vehicles, household appliances, medical appliances, media players, cameras, Machine to Machine (M2M) device, Internet of Things (IOT) device, terminal device, communication device or any type of consumer electronic, for instance but not limited to television, radio, lighting arrangements, tablet computer, laptop or Personal Computer (PC). The communication device 100 may be portable, pocket storable, hand held, computer comprised, or vehicle mounted devices, enabled to communicate voice and/or data, via the access network 320, with another entity, such as another communication device, a server, a laptop, a Personal Digital Assistant (PDA), or a tablet, Machine-to-Machine (M2M) device, device equipped with a wireless interface, such as a printer or a file storage device, modem, or any other system unit capable of communicating over a connection 107, 108 in the wireless communications system 101.

The communication device 100 is enabled to communicate wirelessly within the wireless communications system 101. The communication may be performed e.g. between two communication devices 100, between a communication device 100 and a regular telephone, between the communication device 100 and a network node, between network nodes, and/or between the communication device 100 and a server via the access network 320 and possibly one or more core networks and possibly the internet.

The access nodes 300 may be configured to communicate in the wireless communications system 101 with the communication device 100 over one or more of the connections 107, 108, e.g. a communication link, a radio link, a radio connection, a wired link, a wireless link etc., although communication over more links may be possible. It should be noted that the connection 107, 108 in the wireless communications system 101 may be of any suitable kind comprising either a wired or wireless link. The connections 107, 108 may use any suitable protocol depending on type and level of layer (e.g. as indicated by the Open Systems Interconnection (OSI) model) as understood by the person skilled in the art.

Figure 3:
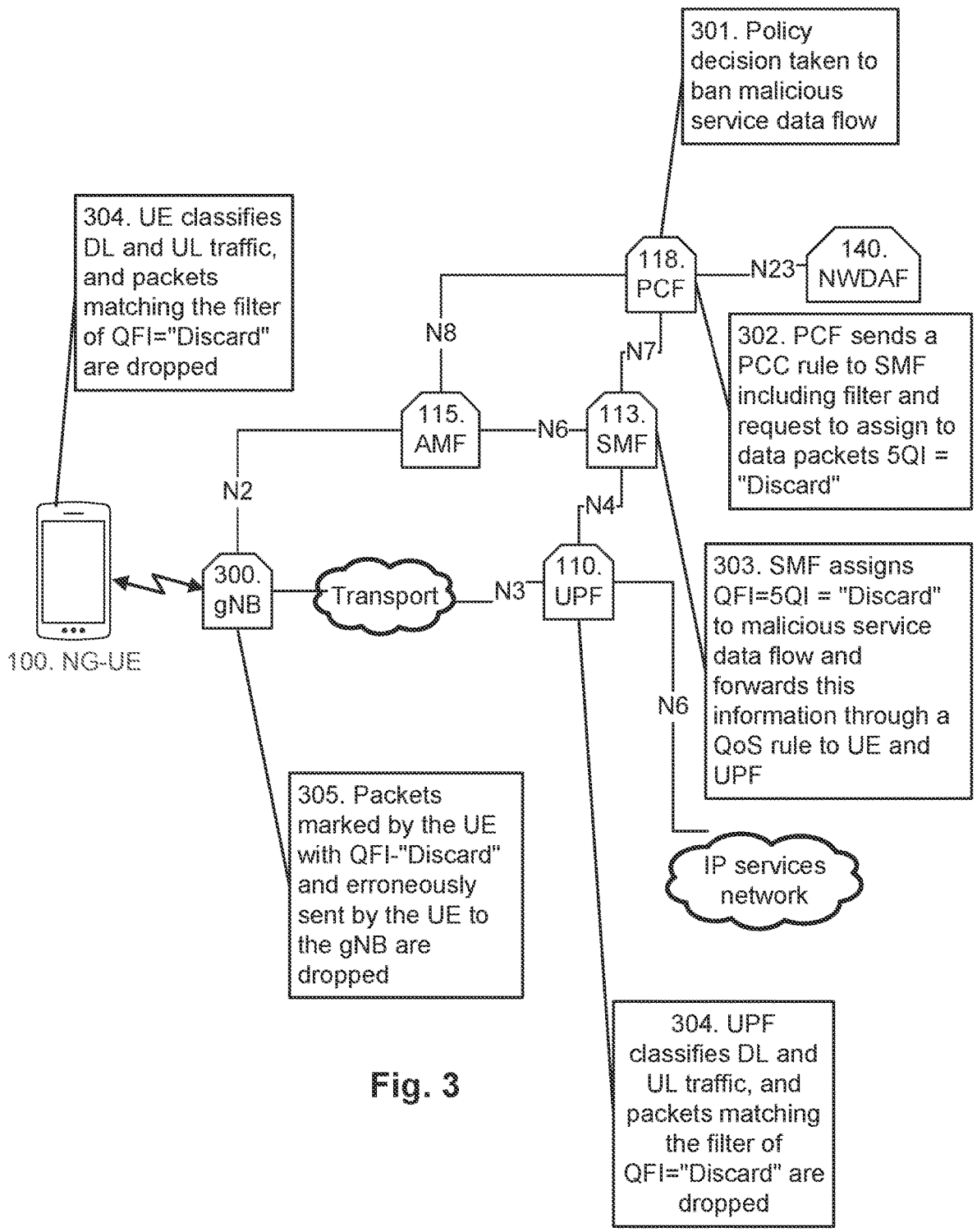
FIG. 3 illustrates operations of various elements of an access network and core network.

FIG. 3 illustrates operations of an access network 320 and the core network. In order to protect the wireless communication system 101 from malicious traffic, e.g. DDoS attacks, the 5GS monitors the behavior of the communication device 100 and of applications. Monitoring of the behaviour may be performed by any suitable node or function in the wireless communication system 101, e.g. an access node 300, a core network node etc. Malicious traffic may be referred to as malicious data traffic, malicious data packets, malicious data flow, malicious IP packet, malicious IP data packet, or it may be referred to as comprising malicious data packets. Malicious traffic may be a threat to the network security and integrity. Malicious traffic may be described as traffic that may be associated with a current or future DoS attack. Malicious traffic may originate from malicious third parties, malicious UEs, network operators or network operator personnel, which exploit the security weaknesses of the security of the wireless communication system 101. Anomalies in traffic that appear due to for example unusual but expected bad radio conditions and broken links may be considered non-malicious traffic.

FIG. 3 uses the 5GS as an example, but the operations in FIG. 3 is equally applicable to any other communication technology such as e.g. 3G, 4G, 6G etc. In FIG. 3, the communication device 100 is exemplified by a NG-UE, the access node 300 is exemplified by a gNB 300, the UPF 110, the SMF 113, the AMF 115, the PCF 118 and the NWDAF 140 are used as examples of network functions, core network functions, but any other functions or nodes are equally applicable.

At step 301 in FIG. 3, the PCF 118 identifies malicious traffic based on, for example, an indication given by the NWDAF 140. Step 301 may also be described as the PCF 118 taking a policy decision to ban a malicious service data flow. The decision to ban a malicious service data flow may also be triggered by a configuration change. A service data flow may be a flow of data packets. When a decision to ban a malicious service data flow is taken, then all data packets of the flow are banned.

If the PCF 118 determines that actions to protect the 5GS are necessary, the PCF 118 installs in the SMF 113 a Policy and Charging Control (PCC) rule comprising a packet filter to classify the malicious service data flow and requests the SMF 113 to assign to user packets matching the packet filter a new, standardized, QoS parameter, e.g. 5QI=Discard (step 302). Using other words, step 302 comprises that the PCF 118 sends the PCC rule to the SMF 113, and where the PCC rules comprises the packet filter and a request to assign to data packets the value of Discard to a 5QI parameter. In general words, an identifier is assigned with a first identifier value, and the first identifier value indicates that a data packet should be discarded, i.e. dropped.

The SMF 113 performs the binding of UP data to a QoS flow. The SMF 113 assigns the OR to the QoS flow and, using the information provided by the PCF 118 in step 302, derives the UPF instructions, the QoS Rule to the UE 100 and the QoS profile to the gNB 300 from the PCC rule and other information. This information is sent through a QoS rule to the UE 100 and UPF 110 (step 303). If a standardized value of 5QI=Discard is used and the 5QI is within the range of the QFI, e.g. a value less than 64, the 5QI value may be used as the OR of the QoS flow, thus implicitly indicating a new behavior in the UE 100. Using other words, in step 303, the SMF 113 assigns QFI=5QI=Discard to the malicious service data flow and forwards this information through a QoS rule to the UE 100 and the UPF 110.

Alternatively, a new predefined and standardized OR value=Discard may be used, indicating implicitly to the UE 100 and the UPF 110 that data packet matching this OH may be dropped.

At step 304, both the UE 100 and the UPF 110 classify incoming data packets based respectively on the QoS rule and the UPF instructions obtained. When a data packet matching the filter has QFI=Discard, the UE 100 and the UPF 110 drop the data packets without forwarding them. Using other words, at step 304, the UE 100 classifies DL and UL traffic, and data packets matching the filter of QFI=Discard are dropped. Step 304 also involves the UPF 110 classifying DL and UL traffic, and data packets matching the filter of QFI=Discard are dropped.

Although no data packets marked with the OH value=Discard should be obtained by the access node 300, if any are obtained due to malicious or incorrect operation, the data packet may be dropped by the gNB 300 (step 305), and further measures may be taken to ensure that the UE 100 utilizes gNB resources to a lesser degree. Using other words, in step 305, data packets marked by the UE 100 with QFI=Discard and erroneously sent by the UE 100 to the gNB 300 are dropped by the gNB 300.

Figure 4:
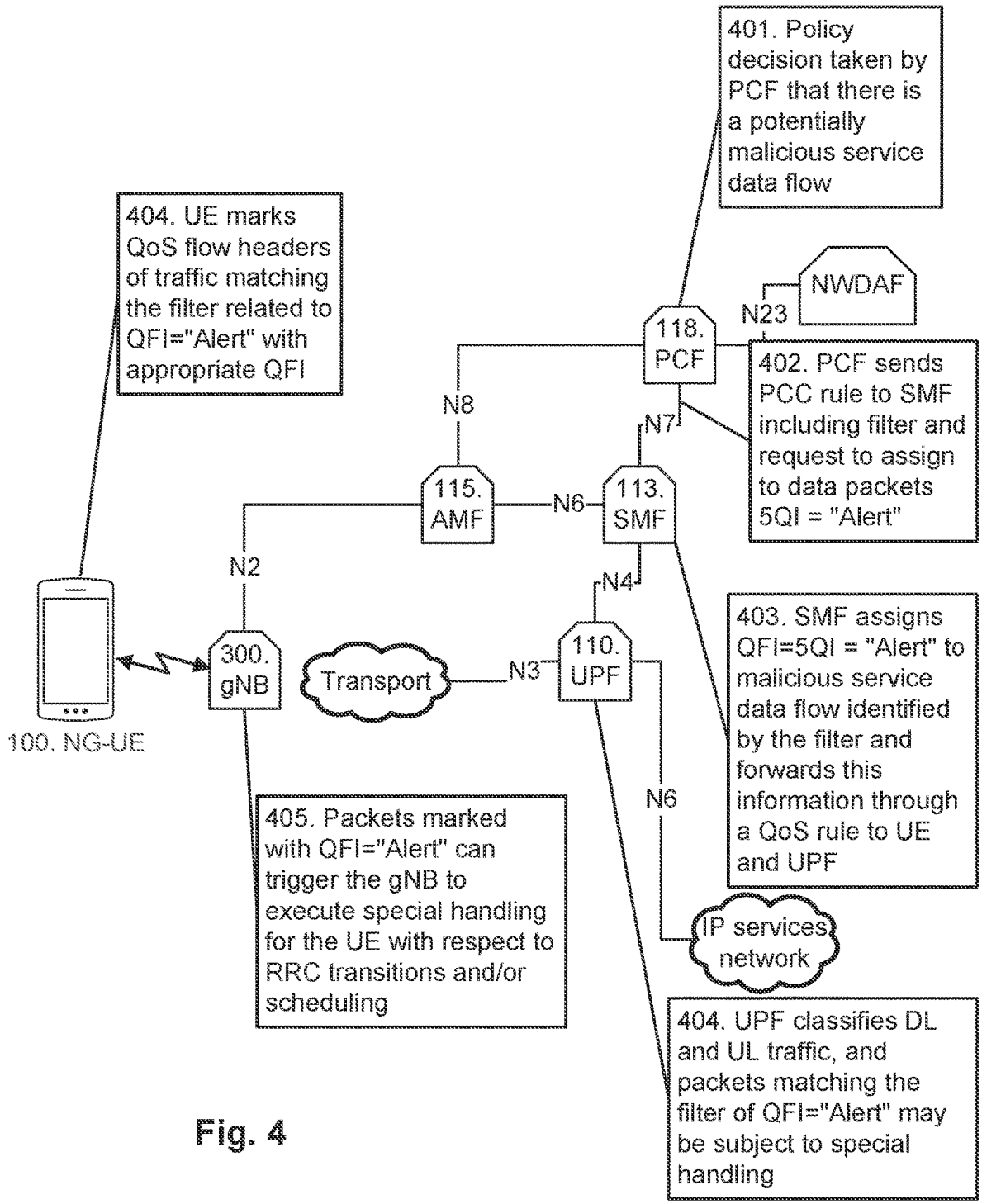
FIG. 4 illustrates operations of various elements of an access network and core network.

Referring to FIG. 4, instead of installing a packet filter for discarding data packets in the communication device 100, as in step 304 in FIG. 3 performed by the communication device 100, the malicious data packet may be mapped onto a QoS flow with a specific OR that indicates that the data packets and/or their senders should be monitored and given special handling if needed. In a similar way as for the Discard QFI, a OH may be assigned a standardized or pre-configured 5QI that is agreed to represent Alert. In general words, an identifier is assigned with a second identifier value, and the first identifier value indicates an alert, i.e. that the data packet should be monitored.

Similar to FIG. 3, FIG. 4 uses the 5GS as an example, but the operations in FIG. 4 is equally applicable to any other communication technology such as e.g. 3G, 4G, 6G etc. In FIG. 4, the communication device 100 is exemplified by a NG-UE, the access node 300 is exemplified by a gNB, the UPF 110, the SMF 113, the AMF 115, the PCF 118 and the NWDAF 140 are used as examples of network functions, core network functions, but any other functions or nodes are equally applicable.

At step 401, the PCF 118 identifies potentially malicious traffic based on, for example, an indication given by the NWDAF 140. The malicious traffic may be referred to as malicious service data flow.

If the PCF 118 determines that actions to protect the 5GS are necessary, the PCF 118 installs, in the SMF 113, a PCC rule comprising a packet filter to classify the malicious data packets and requests the SMF 113 to assign to user data packets matching the packet filter a new, e.g. standardized, QoS parameter, e.g. 5QI=Alert (step 402). The decision to ban a malicious service data flow may also be triggered by a configuration change. Using other words, in step 402, the PCF 118 sends a PCC rule to the SMF 113 comprising the packet filter and request to assign to data packets 5QI=Alert.

The SMF 113 assigns the QFI for a the QoS flow and, using the information provided by the PCF 118, derives the UPF instructions, the QoS rule to the UE 100 and the QoS profile to the access node 300 from the PCC rules and other information. This information is sent through a QoS rule to the UE 100 and the UPF 110 (step 403). If a standardized value of 5QI=Alert is used and the 5QI is within the range of the QFI, e.g. a value less than 64, the 5QI value may be used as the QFI of the QoS flow, thus implicitly indicating a new behavior in the UE 100. Using other words, in step 403, the SMF 113 assigns QFI=5QI=Alert to malicious service data flow identified by the packet filter and forwards this information through a QoS rule to UE 100 and the UPF 110.

At step 404, the UPF 110 classifies incoming data packets based respectively on the QoS rule and the UPF instructions obtained. When a packet matching the filter has QFI=Alert, the UPF 110 may subject the data packet to special handling. Using other words, at step 404, the UPF 110 classifies DL and UL traffic, and data packets matching the packet filter of QFI="Alert" may be subject to special handling. Step 404 may also involve that the UE 100 marks QoS flow headers of traffic matching the filter related to QFI=Alert with the appropriate QFI.

In step 405, data packets marked by the UE 100 with QFI=Alert can trigger the gNB 300 to execute special handling of the data packet and/or the sender UE 100, for example, with respect to RRC transitions and/or scheduling to reduce exposure of the gNB 300 to potentially malicious data packets. Using other words, in step 405, data packets marked with QFI="Alert" may trigger the gNB 300 to execute special handling for the UE 100 with respect to RRC transitions and/or scheduling.

In the Alert scheme, the gNB 300 inspects the QoS flow headers looking for QFI=Alert. Based on this inspection, the gNB 300 may associate the Alert aspect to a UE identity which may be then used, for example, for admission control in regard to RRC transitions. The gNB 300 may react to the Alert indication in a number of ways to reduce exposure to potentially malicious data packets from a UE 100. For example, the gNB 300 may take actions to reduce the resources available to the UE 100 and/or to de-prioritize the UE 100. Such actions may comprise providing less friendly scheduling towards the flow and/or the UE 100, rejection of RRC transitions, e.g., in response to Connection Resume Requests, suspending/releasing the UEs 100 with a non-zero wait time, and/or taking other actions to ensure that the UE 100 utilizes a smaller amount of gNB resources.

By suspending a UE 100 instead of releasing the UE 100, the gNB 300 may be more accurate when identifying the UE 100 in connection with RRC transition requests. Releasing a UE 100 would mean that any differentiation by the gNB 300 at connection establishment would have to rely on the less accurate Temporary Mobile Subscriber Identity (TMSI) identity presented by the UE 100 in the message RRCSetupRequest. The Alert scheme may serve as an intermediate stage before escalating to the all radical approach of discarding anything in the UE 100 that matches the discard filter.

Figure 5:
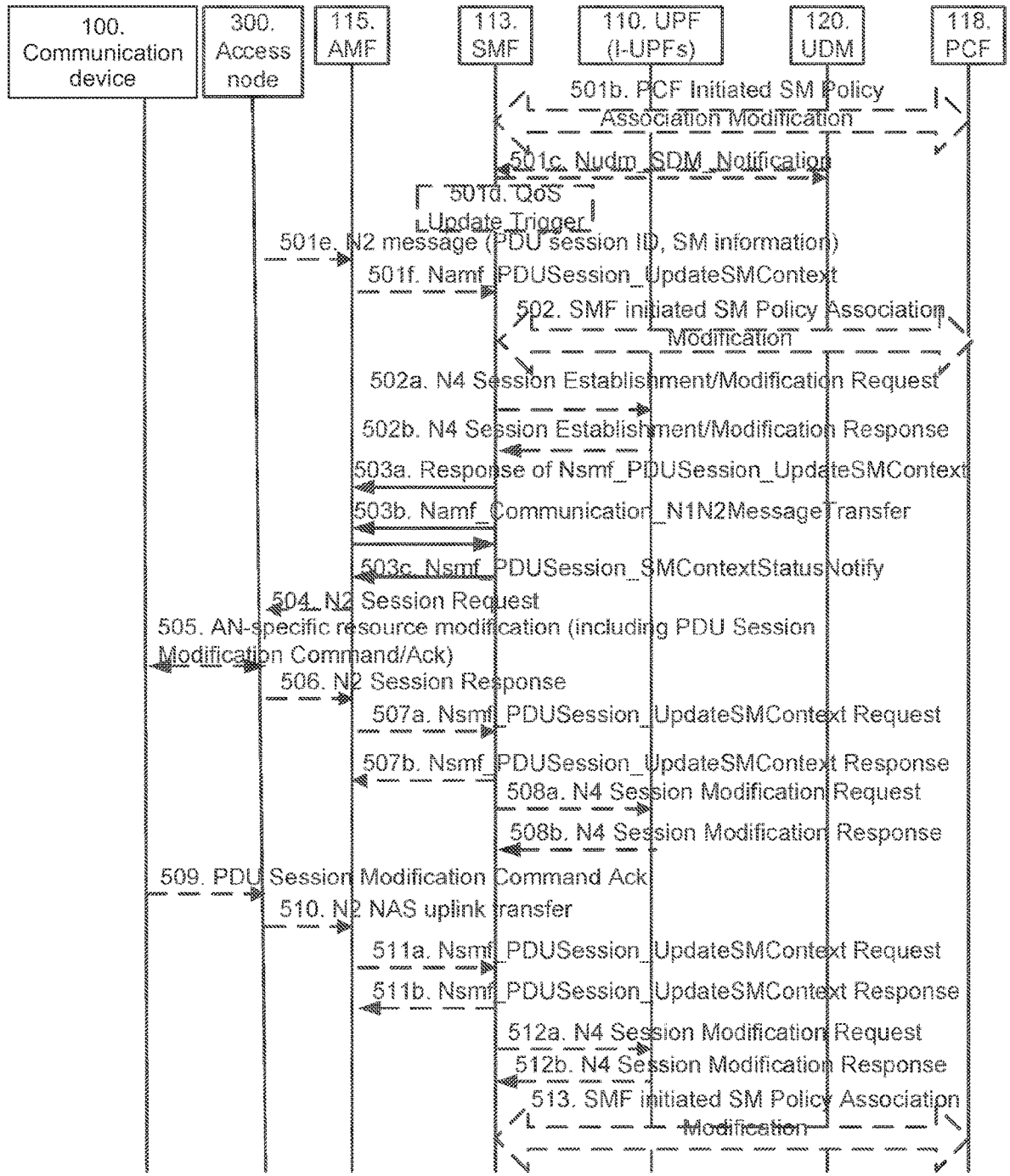
FIG. 5 is a flow diagram that illustrates a Protocol Data Unit (PDU) session modification procedure.

FIG. 5 illustrates a PDU session modification procedure. In FIG. 5, the core network node 200 is exemplified with one or more of an AMF 115, UPF 110 and SMF 113. Referring to FIG. 5, at PDU session establishment or at any time during the PDU session lifetime, the PCF 118 authorizes (step 501*b*) an SM Policy implying that malicious data traffic is classified with 5QI=Discard or Alert. The SMF 113 updates the QoS information and generates the packet filters to be installed in the communication device 100 and UPF 110 to classify the malicious traffic as QFI=5QI=Discard or respectively Alert. This information is forwarded to the UPF 110 (step 502*a* and step 502*b*), to the access node 300 (step 503*b* and step 504) and further to the communication device 100 (step 505). According to the present disclosure, the value of the 5QI and QFI are new together with the associated behavior in the communication device 100 by means of the discard scheme and the access node 300 by means of the alert scheme. The other steps illustrated in FIG. 5 will not be described further herein.

Figure 6:
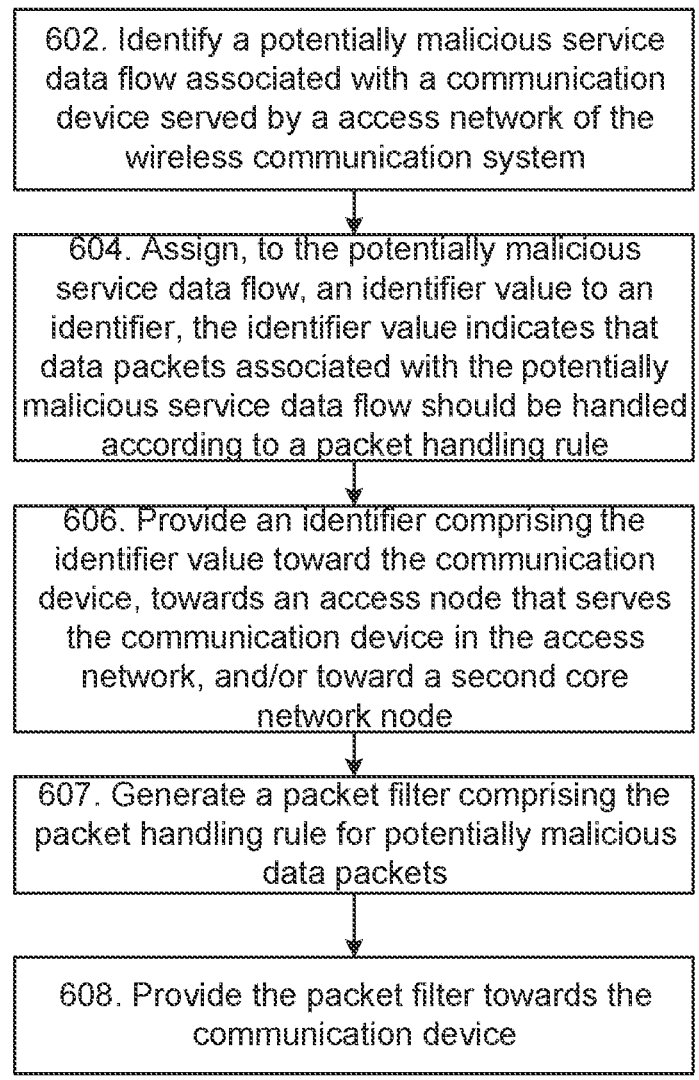
FIG. 6 is a flowchart that illustrates operations of a core network node.

The method described herein will now be described seen from the perspective of the core network node 200. FIG. 6 is a flowchart describing the present method in the core network node 300 for enabling handling of data packets in a wireless communication system 101. In other words, operations of a core network node 200 are illustrated in FIG. 6. The method may also be described as a method of operating a core network node 200 in a core network of a wireless communication system. The method comprises at least one of the following steps to be performed by the core network node 200, which steps may be performed in any suitable order than described below:

Step 602

This step corresponds to step 401 in FIG. 4. The core network node 200 identifies a potentially malicious service data flow associated with a communication device 100 served by an access network 320 of the wireless communication system 101.

The term service data flow may be used when referring to the potentially malicious service data flow herein for the sake of simplicity.

Step 604

This step corresponds to step 303 in FIG. 3 and step 403 in FIG. 4. The core network node 200 assigns, to the potentially malicious service data flow, an identifier value to an identifier. The identifier value indicates that data packets associated with the potentially malicious service data flow should be handled according to a data packet handling rule for potentially malicious data packets. The packet handling rule may be a predetermined packet handling rule.

The identifier value may be a first identifier value, e.g. discard. The identifier value may be a second identifier value, e.g. alert. The first identifier value indicates that the data packet should be dropped. The second identifier value indicates that the data packet should be monitored.

Step 606

This step corresponds to step 303 in FIG. 3 and step 403 in FIG. 4. The core network node 200 provides the identifier comprising the identifier value towards the communication device 100, towards at least one of:

an access node 300 that serves the communication device 100 in the access network 320, and/or toward a second core network node that processes data packets to, from or both to and from the communication device 100.

The second core network node mentioned above is a different core network node than the one which performs step 606. To clarify, the core network node which performs step 606 may be referred to as a first core network node and the core network node towards which the identifier is provided may be referred to as a second core network node. When the term core network node is used herein together with the reference number 200 it refers to the first core network node, unless otherwise stated.

Providing the identifier may comprise transmitting the identifier towards the communication device 100. Providing the identifier may comprise making the identifier accessible to the communication device 100, e.g. in a memory, a cloud memory, from where the communication device 100 may obtain the identifier etc.

Step 607

This step corresponds to step 302 in FIG. 3 and step 402 in FIG. 4. The core network node 200 may generate a packet filter comprising a packet handling rule for potentially malicious data packets. The packet filter may be associated with the identifier value.

Step 608

This step corresponds to step 302 in FIG. 3 and step 402 in FIG. 4. The core network node 300 may provide the packet filter toward the communication device 100.

Providing the packet filter may comprise transmitting the packet filter towards the communication device 100. Providing the packet filter may comprise making the packet filter accessible to the communication device 100, e.g. in a memory, a cloud memory, from where the communication device 100 may obtain the packet filter etc.

The identifier may comprise a QoS Flow Identifier (OH). The identifier may comprise a 5G QoS identifier (5QI) associated to the QFI.

The identifier value of the identifier may indicate that data packets associated with the potentially malicious service data flow should be dropped by the communication device 100, the access node 300, and/or a core network function, such as the UPF 110. The identifier value may implicitly indicate that data packets belonging to the service data flow should be dropped or monitored.

The identifier value may indicate that data packets associated with the potentially malicious service data flow should be monitored within the access network 320.

The identifier value may indicate that the communication device 100 associated with the potentially malicious service data flow should be deprioritized by the access node 300.

The identifier value may indicate that network resources for the communication device 100 associated with the potentially malicious service data flow should be restricted by the access node 300.

The access node 300 may comprise a base station, such as a gNodeB.

The packet handling rule associated with the identifier value may be pre-configured in at least one of:

the communication device 100, and the access node 300.

The core network node 200 may comprise at least one of an AMF 115, an UPF 110 and a SMF 113. The SMF 113 may bind the potentially malicious service data flow to a QoS Flow, in response to a request from a PCF 118 of the core network.

The request from the PCF 118 may comprise a packet filter to classify data packets in the potentially malicious service data flow and a request to assign the identifier value to the potentially malicious service data flow.

Figure 7:
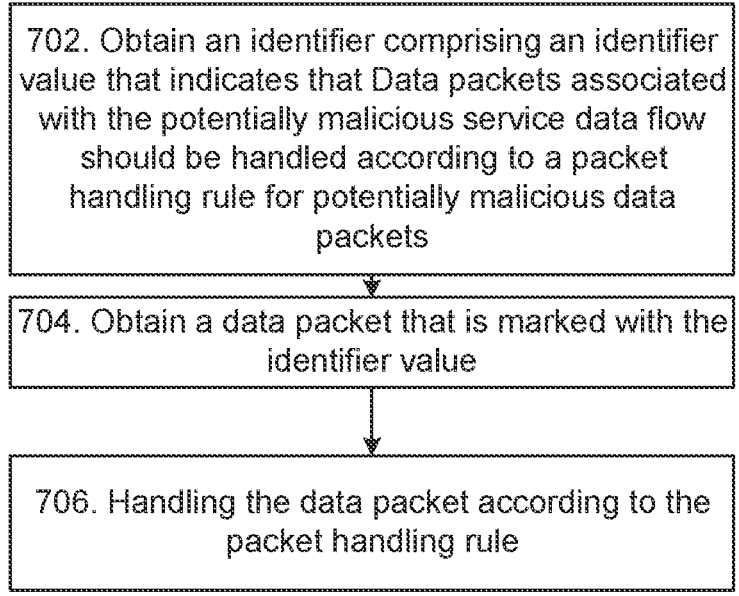
FIG. 7 is a flowchart that illustrates operations of an access node.

The method described herein will now be described seen from the perspective of the access node 300. FIG. 7 is a flowchart describing the present method in the access node 300 for enabling handling of data packets in a wireless communication system 101. In other words, operations of an access node 300 are illustrated in FIG. 7. The access node 300 may be a RAN node. The access node 300 may be a gNB. The access node 300 may comprise a base station. The method may also be described as a method of operating an access node 300 in an access network 320 of a wireless communication system. The method is described below as being performed by the access node 300, but the method may equally be performed by a second core network node, e.g. the UPF 110, that processes data packets to and from the communication device 100. The method comprises at least one of the following steps to be performed by the access node 300, which steps may be performed in any suitable order than described below:

Step 702

The access node 300 obtains, from a core network node 200, an identifier comprising an identifier value that indicates that data packets associated with the potentially malicious service data flow should be handled according to a packet handling rule for potentially malicious data packets.

The identifier value may be a first identifier value, e.g. discard. The identifier value may be a second identifier value, e.g. alert. The first identifier value indicates that the data packet should be dropped. The second identifier value indicates that the data packet should be monitored.

The identifier value may be associated with a potentially malicious service data flow.

The packet handling rule may be a predetermined packet handling rule.

The packet handling rule may be predetermined or pre-configured in the access node 300.

The obtaining may comprise receiving the identifier comprising the identifier value. The identifier may be obtained by receiving it from the core network node 200 directly or via an intermediate node such as e.g. a memory, a cloud memory etc., it may be obtained upon request, at regular time intervals, at a predetermined time or in any other suitable way.

The identifier may comprise a QFI.

The identifier may comprise a 501 associated to the QFI.

The identifier value may indicate that data packets associated with the potentially malicious service data flow should be dropped by the access node 300.

The identifier value may indicate that data packets associated with the potentially malicious service data flow should be monitored by the access node 300.

The identifier value may indicate that a communication device 100 associated with the potentially malicious service data flow should be deprioritized by the access node 300.

The identifier value may indicate that network resources for a communication device 100 associated with the potentially malicious service data flow should be restricted by the access node 300.

The identifier value may implicitly indicate that data packets belonging to the potentially malicious service data flow should be dropped or monitored.

Step 704

The access node 300 obtains a data packet that is marked with the identifier value. Obtaining the data packet may comprise receiving the data packet. The data packet may be obtained by receiving it from the core network node 200 directly or via an intermediate node such as e.g. a memory, a cloud memory etc., it may be obtained upon request, at regular time intervals, at a predetermined time or in any other suitable way.

Step 706

This step corresponds to step 305 in FIG. 3 and step 405 in FIG. 4. The access node 300 handles the data packet according to the packet handling rule for potentially malicious data packets. The packet handling rule may be a predetermined packet handling rule.

Handling the data packet may comprise that the access node 300 drops the data packet.

Handling the data packet may comprise that the access node 300 monitors the data packet.

Figure 8:
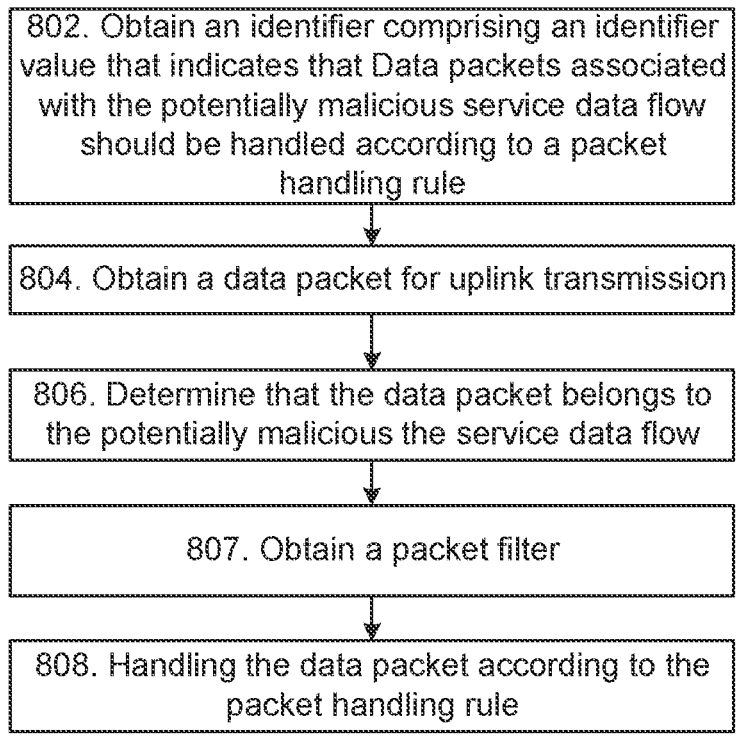
FIG. 8 is a flowchart that illustrates operations of a communication device.

The method described herein will now be described seen from the perspective of the communication device 100. FIG. 8 is a flowchart describing the present method in the communication device 100 for enabling handling of data packets in a wireless communication system 101. In other words, operations of a communication device 100 are illustrated in FIG. 8. The communication device 100 may be a UE. The method may also be described as a method of operating a communication device 100 in a wireless communication system 101. The method comprises at least one of the following steps to be performed by the communication device 100, which steps may be performed in any suitable order than described below:

Step 802

The communication device 100 obtains an identifier comprising an identifier value that indicates that data packets associated with the potentially malicious service data flow should be handled, e.g. dropped or monitored, according to a packet handling rule for potentially malicious data packets. Obtaining the identifier may comprise receiving the identifier. The identifier comprising the identifier value may be associated with a potentially malicious service data flow.

The identifier value may be a first identifier value, e.g. discard. The identifier value may be a second identifier value, e.g. alert. The first identifier value indicates that the data packet should be dropped. The second identifier value indicates that the data packet should be monitored.

The identifier may be obtained by receiving it from the core network node 200 directly or via an intermediate node such as e.g. a memory, a cloud memory etc., it may be obtained upon request, at regular time intervals, at a predetermined time or in any other suitable way.

The identifier value may implicitly indicate that data packets belonging to the potentially malicious service data flow should be dropped.

The identifier may comprise a QFI.

The identifier may comprise a 5QI associated to the QFI.

The identifier value may indicate that data packets associated with the potential malicious service data flow should be dropped by the communication device 100 or monitored within an access node 300.

The identifier value may implicitly indicate that data packets belonging to the potential malicious service data flow should be dropped or monitored within an access node 300.

Step 804

The communication device 100 obtains a data packet for uplink transmission. Obtaining the data packet may comprise receiving the data packet. The data packet may be obtained from an application comprised in the communication device 100.

The data packet may be obtained by receiving it from the application directly or via an intermediate node such as e.g. a memory, a cloud memory etc., it may be obtained upon request, at regular time intervals, at a predetermined time or in any other suitable way.

Step 806

The communication device 100 determines that the data packet belongs to the potentially malicious service data flow.

Step 807

This step corresponds to step 302 in FIG. 3 and step 402 in FIG. 4. The communication device 100 may obtain a packet filter from the core network node 200. The packet filter may comprise the packet handling rule. The identifier value may indicate that the data packet associated with the potential malicious service data flow should be handled by being dropped by the communication device 100 or monitored within an access node 300.

Step 808

This step corresponds to step 304 in FIG. 3 and step 404 in FIG. 4. The communication device 100 handles the data packet according to the packet handling rule for potentially malicious data packets. The handling of the data packet may comprise that the communication device 100 drops the data packet without providing, e.g. transmitting, the data packet to an access node 300.

The packet handling rule associated with the identifier value may be predetermined or pre-configured in the communication device 100.

Figure 9:
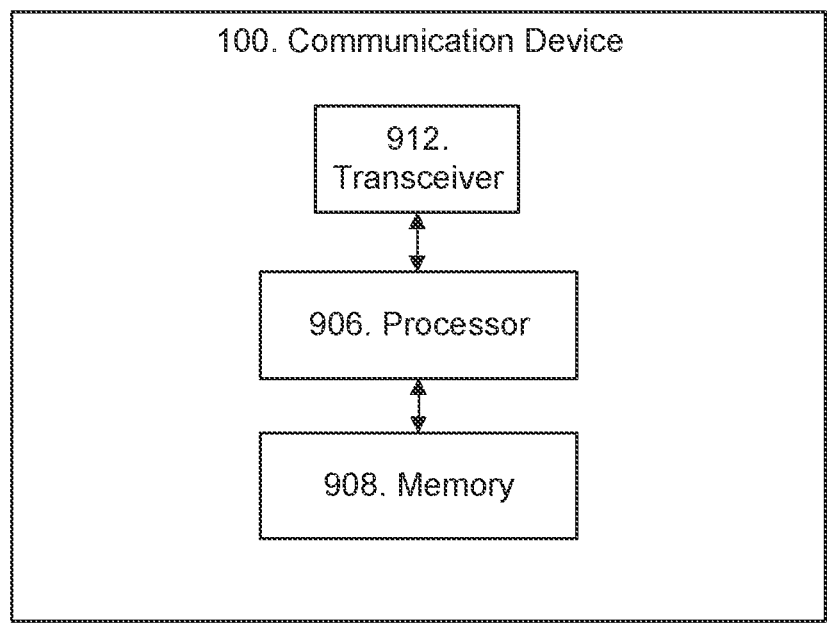
FIG. 9 is a block diagram illustrating an example of a communication device.

The handling of the data packet may comprise that the communication device 100 drops the data packet without providing the data packet to an access node 300 when the packet handling ruled indicates dropping FIG. 9 depicts a communication device 100 of the wireless communication system 101 configured to provide wireless communication. As shown, the communication device 100 may comprise a transceiver 912, also referred to as a transceiver circuit, comprising a transmitter and a receiver configured to provide uplink and downlink communications with access nodes 300. The communication device 100 may also comprise a processor 906 also referred to as a processing circuit, coupled to the transceiver 912, and a memory 908, also referred to as memory circuit, coupled to the processor 906. The memory 908 may comprise computer readable program code that when executed by the processor circuit 906 causes the processor 906 to perform operations as disclosed herein. The processor 906 may be defined to comprise the memory 908 so that a separate memory is not required.

Operations, methods or steps of the communication device 100 may be performed by processor 906 and/or transceiver 912. For example, the processor 906 may control the transceiver 912 to provide, e.g. transmit, uplink communications through the transceiver 912 over a radio interface to one or more access nodes 300 and/or to obtain, e.g. receive, downlink communications through the transceiver 912 from one or more access nodes 300 over a radio interface. Moreover, modules may be stored in the memory 908, and these modules may provide instructions so that when instructions of a module are executed by the processor 906, the processor 906 performs respective operations, e.g., operations discussed above with.

The communication device 100 may comprise a processor 906, the transceiver 912 coupled to the processor 906, and the memory 908 coupled to the processor 906. The memory 908 comprises machine readable program instructions that, when executed by the processor circuit, cause the communication device 100 to perform operations described above.

To perform the method steps shown in FIG. 8 for enabling handling of data packets in a wireless communication system 101, the communication device 100 may comprises an arrangement as shown in FIG. 9.

The communication device 100 is configured to obtain, e.g. receive, an identifier comprising an identifier value that indicates that data packets associated with the potentially malicious service data flow should be handled, e.g. dropped or monitored, according to a packet handling rule for potentially malicious data packets. The identifier may be associated with a potentially malicious service data flow.

The identifier may comprise a QFI.

The identifier may comprise a 501 associated to the QFI.

The identifier value may indicate that data packets associated with the potential malicious service data flow should be dropped by the communication device 100 or monitored within an access node 300.

The packet handling rule may be predetermined or pre-configured in the communication device 100.

The identifier value may implicitly indicate that data packets belonging to the potential malicious service data flow should be dropped by the communication device (100) or monitored within an access node 300.

The communication device 100 is configured to obtain, e.g. receive, a data packet for uplink transmission. The data packet may be obtained from an application in the communication device 100.

The communication device 100 is configured to determine that the data packet belongs to the potentially malicious service data flow.

The communication device 100 is configured to handle the data packet according to the packet handling rule for potentially malicious data packets. The handling of the data packets may comprise dropping the data packet without providing, e.g. transmitting, the data packet to an access node 300 when the packet handling rule indicates dropping.

The communication device 100 may be configured to obtain a packet filter from the core network node 200. The packet filter may comprise the packet handling rule. The identifier value may indicate that the data packet associated with the potential malicious service data flow should be handled by being dropped by the communication device 100 or monitored within an access node 300.

Referring to FIGS. 8 and 9, a communication device 100 may comprise a processor 906, a transceiver 912 coupled to the processor 906 and a memory 908 coupled to the processor 906.

The memory 908 comprises computer readable program instructions that, when executed by the processor 906, cause the communication device 100 to perform operations comprising obtaining, e.g. receiving, an identifier comprising an identifier value that indicates that data packets associated with the potentially malicious service data flow should be handled, e.g. dropped or monitored, according to a packet handling rule for potentially malicious data packets.

The identifier may comprise a QFI.

The identifier may comprise a 501 associated to the QFI.

The identifier value may indicate that data packets associated with the potential malicious service data flow should be dropped by the communication device 100 or monitored within an access node 300.

The packet handling rule may be predetermined or pre-configured in the communication device 100.

The identifier value may implicitly indicate that data packets belonging to the potential malicious service data flow should be dropped by the communication device 100 or monitored within an access node 300.

The computer readable program instructions cause the communication device 100 to perform operations comprising obtaining, e.g. receiving, a data packet for uplink transmission. The data packet may be obtained from an application in the communication device 100.

The computer readable program instructions cause the communication device 100 to perform operations comprising determining that the data packet belongs to the potentially malicious service data flow.

The computer readable program instructions cause the communication device 100 to perform operations comprising handling the data packet according to the packet handling rule for potentially malicious data packets. The handling of the data packet may comprise dropping the data packet without providing, e.g. transmitting, the data packet to an access node 300 when the packet handling rule indicates dropping.

The computer readable program instructions may cause the communication device 100 to perform operations comprising obtaining the packet filter from the core network node 200. The packet filter may comprise the packet handling rule. The identifier value may indicate that the data packet associated with the potential malicious service data flow should be handled by being dropped by the communication device 100 or monitored within an access node 300.

Figure 10:
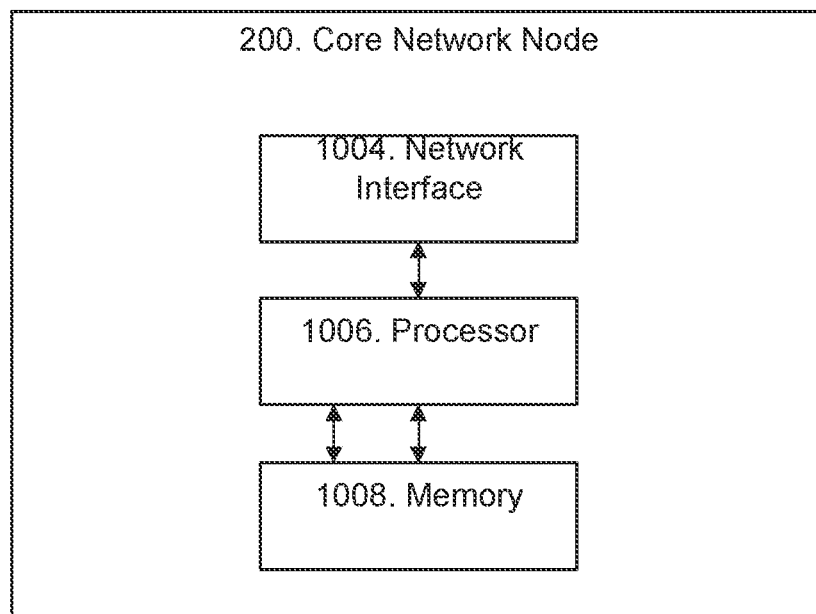
FIG. 10 is a block diagram illustrating an example of a core network node.

FIG. 10 is a block diagram of a core network node 200. The core network node 200 may be the first core network node. The core network node 200 comprises a processor 1006 and a memory 1008 coupled to the processor 1006. The memory 1008 comprises machine-readable computer program instructions that, when executed by the processor 1006, cause the processor 1006 to perform at least some of the operations and methods described herein.

FIG. 10 depicts a core network node 200 of a wireless communication system 101 configured to provide communication according to the present disclosure. The core network node 200 may comprises a network interface 1004, also referred to as a network interface circuit, configured to provide communications with other nodes, e.g., with other core network nodes and/or access nodes, of the wireless communication system 1010. The memory 1008, also referred to as memory circuit, may comprise computer readable program code that when executed by the processor 1006, also referred to as processing circuit, causes the processor 1006 to perform operations and methods as described herein. The processor 1006 may be defined to comprise the memory 1008 so that a separate memory circuit is not required.

As discussed herein, operations of the core network node 200 may be performed by processor 1006 and/or network interface 1004. For example, the processor 1006 may control the network interface 1004 to provide communications through the network interface 1004 to one or more other core network nodes and/or to obtain communications through the network interface 1004 from one or more other core network nodes. Moreover, modules may be stored in the memory 1008, and these modules may provide instructions so that when instructions of a module are executed by the processor 1006, the processor 1006 performs respective operations. In addition, a structure similar to that of FIG. 10 may be used to implement other core network nodes. Moreover, the core network nodes 200 discussed herein may be implemented as virtual network nodes.

Referring to FIG. 6 and FIG. 10, a core network node 200 is configured to identify a potentially malicious service data flow associated with a communication device 100 served by an access network 320 of the wireless communication system 101.

The core network node 200 is configured to assign, to the potentially malicious service data flow, an identifier value to an identifier. The identifier value indicates that data packets associated with the potentially malicious service data flow should be handled according to a packet handling rule for potentially malicious data packets. The packet handling rule may be a potentially malicious packet handling rule.

The identifier value may indicate that data packets associated with the potentially malicious service data flow should be dropped by at least one of the communication device 100 and the access node 300.

The identifier value may indicate that data packets associated with the potentially malicious service data flow should be monitored within the access network 320.

The identifier value may indicate that the communication device 100 associated with the potentially malicious service data flow should be deprioritized by the access node 300.

The identifier value may indicate that network resources for the communication device 100 associated with the potentially malicious service data flow should be restricted by the access node 300.

The identifier value may implicitly indicate that data packets belonging to the potentially malicious service data flow should be dropped or monitored.

The core network node 200 is configured to provide, e.g. transmit, the identifier comprising the identifier value towards the communication device 100, towards an access network node 300 that serves the communication device 100 in the access network 320, and/or toward a second core network node 103 that processes data packets to, from or both to and from the communication device 100.

The identifier may comprise a QFI.

The identifier may comprise a 501 associated to the QFI.

The core network node 200 may be configured to generate a packet filter comprising the packet handling rule for potentially malicious data packets.

The core network node 200 may be configured to provide the packet filter toward the communication device 100.

The core network node 200 may comprise at least one of an AMF 115, and a UPF 110 and a SMF 113.

The SMF 113 may bind the potentially malicious service data flow to a QoS flow in response to a request from a PCF 118 of the core network. The request from the PCF 118 comprises a packet filter to classify data packets in the potentially malicious service data flow and a request to assign the identifier value to the potentially malicious service data flow.

Referring to FIG. 6 and FIG. 10, a core network node 200 comprises a processor 1006, a network interface 1004 coupled to the processor 1006 and a memory 1008 coupled to the processor 1006. The memory 1008 comprises computer readable program instructions that, when executed by the processor 1006, cause the core network node 200 to perform operations comprising identifying a potentially malicious service data flow associated with a communication device 100 served by an access network 320 of the wireless communication system 101; assigning, to the potentially malicious service data flow, an identifier value to an identifier that indicates that data packets associated with the potentially malicious service data flow should be handled according to a packet handling rule for potentially malicious data packets; and providing, e.g. transmitting, the identifier comprising the identifier value toward the communication device 100, toward a access node 300 that serves the communication device 100 in the access network 320, and/or toward a second core network node 103 that processes data packets to/from the communication device 100.

Figure 11:
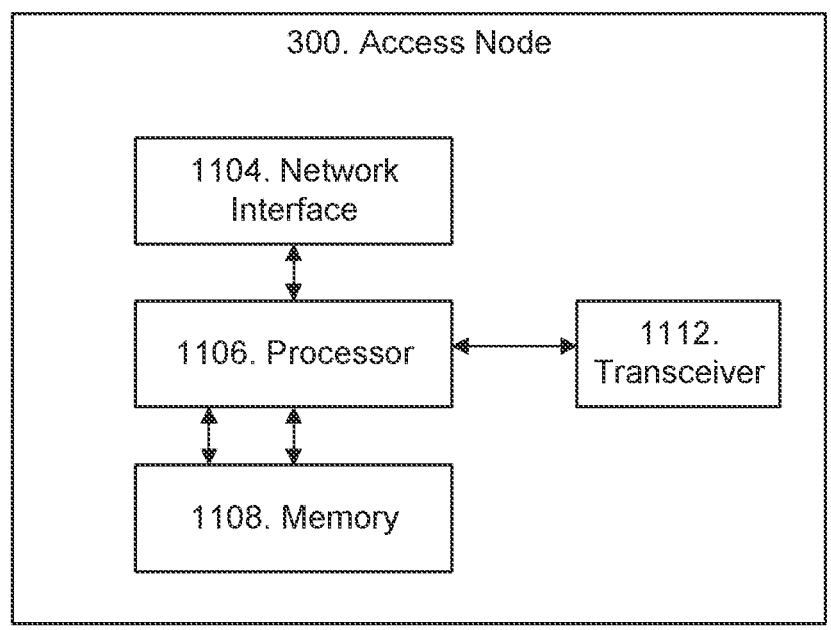
FIG. 11 is a block diagram illustrating an example of an access node.

FIG. 11 is a block diagram of an access node 300. The access node 300 comprises a processor 1106, also referred to as a processor circuit, and a memory 1108, also referred to as a memory circuit, coupled to the processor 1106. The memory 1108 comprises machine-readable computer program instructions that, when executed by the processor 1106, cause the processor 1106 to perform at least some of the operations and methods described herein. Even though FIG. 11 is described as illustrating an access node, it may equally illustrate a second core network node, e.g. the UPF 110, that is adapted to processes data packets to and from the communication device 100.

FIG. 11 depicts an access node 300 of a wireless communication system 101 configured to provide communication according to the present disclosure. The access node 300 may comprise a network interface 1104, also referred to as a network interface circuit, configured to provide communications with other nodes, e.g., with other access nodes 300 and/or core network nodes 200 and/or communication devices 100 of the wireless communication system 101. The access node 300 comprises a transceiver 1112, e.g. a wireless transceiver, for providing communications with the communication device 100. The memory circuit 1108 may comprise computer readable program code that when executed by the processor 1106 causes the processor 1106 to perform operations and methods as described herein. The processor 1106 may be defined to comprise the memory 1108 so that a separate memory circuit is not required.

Operations of the access node 300 may be performed by or via the processor 1106 and/or the network interface 10004. The processor 1106 may control the network interface 1104 to provide, e.g. transmit, communications through the network interface 1104 to one or more other network nodes and/or to obtain, e.g. receive, communications through the network interface 1104 from one or more other network nodes. Moreover, modules may be stored in the memory 1108, and these modules may provide instructions so that when instructions of a module are executed by the processor 1106, the processor 1106 performs respective operations and/or methods. A structure similar to that of FIG. 11 may be used to implement other access nodes 300. Moreover, access nodes 300 discussed herein may be implemented as virtual access nodes.

Referring to FIG. 7 and FIG. 11, an access node 300 is configured to obtain, e.g. receive, from a core network node 200, an identifier comprising an identifier value that indicates that data packets associated with the potentially malicious service data flow should be handled according to a packet handling rule for potentially malicious data packets.

The access node 300 is configured to obtain, e.g. receive, a data packet that is marked with the identifier comprising the identifier value.

The identifier may comprise a QFI.

The identifier may comprise a 5QI associated to the QFI.

The identifier value may indicate that data packets associated with the potentially malicious service data flow should be dropped by the access node 300.

The identifier value may indicate that data packets associated with the potentially malicious service data flow should be monitored by the access node 300.

The identifier value may indicate that a communication device 100 associated with the potentially malicious service data flow should be deprioritized by the access node 300.

The identifier value may indicate that network resources, e.g. access node resources, for a communication device 100 associated with the potentially malicious service data flow should be restricted by the access node 300.

The identifier value may implicitly indicate that data packets belonging to the potentially malicious service data flow should be dropped or monitored.

The access node 300 is configured to handle the data packet according to the packet handling rule for potentially malicious data packets. Handling the data packet may comprise dropping the data packet. Handling the data packet may comprise monitoring the data packet.

The packet handling rule may be predetermined or preconfigured in the access node 300.

The access node 300 may comprise a base station.

Referring to FIG. 7 and FIG. 11, an access node 300 comprises a processor 1106 a network interface 1104 coupled to the processor 1106 and a memory 1108 coupled to the processor 1106.

The memory 1108 comprises computer readable program instructions that, when executed by the processor 1106, cause the access node 300 to perform operations comprising obtaining, e.g. receiving, from a core network node 200, an identifier comprising an identifier value that indicates that data packets associated with the potentially malicious service data flow should be handled according to a packet handling rule for potentially malicious data packets.

The identifier may comprise a QFI.

The identifier may comprise a 5QI associated to the QFI.

The identifier value may indicate that data packets associated with the potentially malicious service data flow should be dropped by the access node 300.

The identifier value may indicate that data packets associated with the potentially malicious service data flow should be monitored by the access node 300.

The identifier value may indicate that a communication device 100 associated with the potentially malicious service data flow should be deprioritized by the access node 300.

The identifier value may indicate that network resources for a communication device 100 associated with the potentially malicious service data flow should be restricted by the access node 300.

The identifier value may implicitly indicate that data packets belonging to the potentially malicious service data flow should be dropped or monitored.

The memory 1108 comprises computer readable program instructions that cause the access node 300 to perform operations comprising obtaining, e.g. receiving, a data packet that is marked with the identifier comprising the identifier value.

The memory 1108 comprises computer readable program instructions that cause the access node 300 to perform operations comprising handling the data packet according to the packet handling rule for potentially malicious data packets. Handling the data packet may comprise dropping the data packet. Handling the data packet may comprise monitoring the data packet.

The packet handling rule may be predetermined or preconfigured in the access node 300.

The access node 300 may comprise a base station.

In the present disclosure, it is to be understood that the terminology used herein is not intended to be limiting. Unless otherwise defined, all terms comprising technical and scientific terms used herein have the same meaning as commonly understood by one of ordinary skill in the art to which present disclosure belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, a "communication device" may be any device intended for accessing services via an access network and configured to communicate over the access network. For instance, the communication device may be, but is not limited to: a UE, mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The communication device may be a portable, pocket storable, handheld, computer-comprised, or vehicle-mounted mobile device, enabled to communicate voice and/or data, via a wireless or wireline connection.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may comprise wirelessly coupled, connected, or responsive. As used herein, the singular forms "a", "an" and "the" are intended to comprise the plural forms as well, unless the context clearly indicates otherwise. Well-known functions or constructions may not be described in detail for brevity and/or clarity. The term "and/or" comprises any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation could be termed a second element/operation. The same reference numerals or the same reference designators denote the same or similar elements throughout the specification.

As used herein, the terms "comprise", "comprising", "comprises", "comprise", "comprising", "comprises", "have", "has", "having", or variants thereof are open-ended, and comprise one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

The present disclosure is described herein with reference to block diagrams and/or flowchart illustrations of computer-implemented methods, apparatus, e.g. systems and/or devices, and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture comprising instructions which implement the functions/acts specified in the block diagrams and/or flowchart block or blocks. Accordingly, the present disclosure may be embodied in hardware and/or in software, comprising firmware, resident software, micro-code, etc., that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Other blocks may be added/inserted between the blocks that are illustrated, and/or blocks/operations may be omitted. Moreover, although some of the diagrams comprise arrows on communication paths to show a primary direction of communication, it is to be understood that communication may occur in the opposite direction to the depicted arrows.

Many variations and modifications can be made. All such variations and modifications are intended to be comprised herein within the scope of present disclosure. Accordingly, the present disclosure is to be considered illustrative, and not restrictive, and the present disclosure is intended to cover all such modifications, enhancements, etc. Thus, to the maximum extent allowed by law, the scope of the present disclosure is to be determined by the broadest permissible interpretation of the present disclosure comprising the examples and their equivalents and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature disclosed herein may be applied to any other feature, wherever appropriate. Likewise, any advantage may apply to any other feature, and vice versa. Other objectives, features and advantages will be apparent from the present disclosure.

Figure 12:
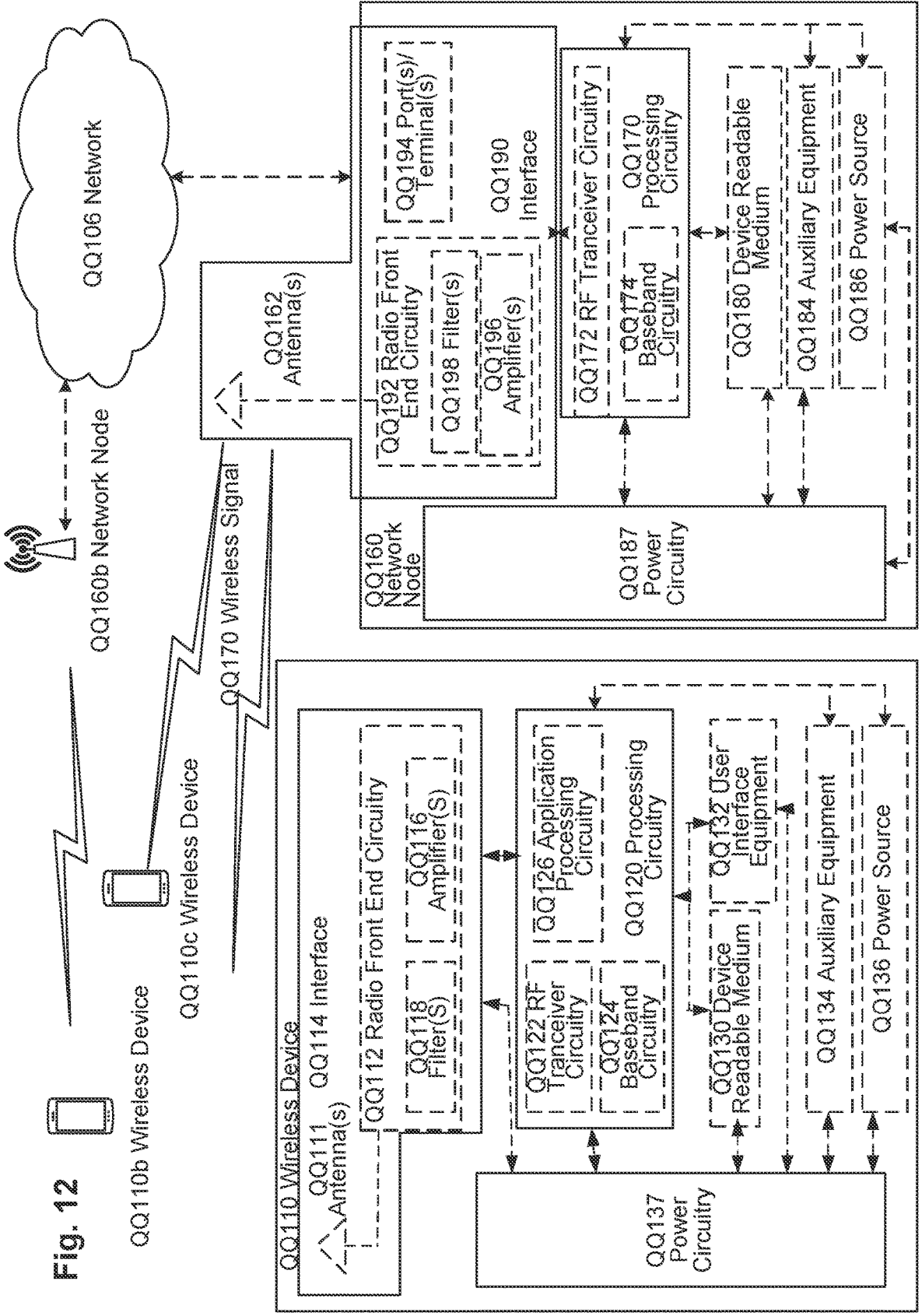
FIG. 12 is a block diagram of a wireless communication network.

Further Extensions and Variations:

FIG. 12 illustrates a wireless network. Although the subject matter described herein may be implemented in any appropriate type of system using any suitable components, the present disclosure is described in relation to a wireless network, such as the example wireless network illustrated in FIG. 12. For simplicity, the wireless network of FIG. 12 only depicts network QQ106, network nodes QQ160 and QQ160*b*, and WDs QQ110, QQ110*b*, and QQ110*c* (also referred to as mobile terminals). In practice, a wireless network may further comprise any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. The wireless network may be configured to operate according to specific standards or other types of predefined rules or procedures. Thus, the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. The wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes comprise, but are not limited to, access points (APs), e.g., radio access points, base stations (BSs), e.g., radio base stations, Node Bs, evolved Node Bs (eNBs) and NR NodeBs (gNBs). Base stations may be categorized based on the amount of coverage they provide, or, stated differently, their transmit power level, and may then also be referred to as femto base stations, pico base stations, micro base stations, or macro base stations. A base station may be a relay node or a relay donor node controlling a relay. A network node may also comprise one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes comprise multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 comprises processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that comprises the illustrated combination of hardware components, other network nodes with different combinations of components may be comprised. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component, e.g., device readable medium QQ180 may comprise multiple separate hard drives as well as multiple RAM modules.

Similarly, network node QQ160 may be composed of multiple physically separate components, e.g., a NodeB component and an RNC component, or a BTS component and a BSC component, etc., which may each have their own respective components. In certain scenarios in which network node QQ160 comprises multiple separate components, e.g., BTS and BSC components, one or more of the separate components may be shared among several network nodes. For example, a single RNC may control multiple NodeB's. In such a scenario, each unique NodeB and RNC pair, may in some instances be considered a single separate network node. The network node QQ160 may be configured to support multiple Radio Access Technologies (RATs). Some components may be duplicated, e.g., separate device readable medium QQ180 for the different RATs, and some components may be reused, e.g., the same antenna QQ162 may be shared by the RATs. Network node QQ160 may also comprise multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations, e.g., certain obtaining operations, described herein as being provided by a network node. These operations performed by processing circuitry QQ170 may comprise processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may comprise providing any of the various wireless features, functions, or benefits discussed herein. The processing circuitry QQ170 may comprise a system on a chip (SOC).

The processing circuitry QQ170 may comprise one or more of radio frequency (RF) transceiver circuitry QQ172 and baseband processing circuitry QQ174. The radio frequency (RF) transceiver circuitry QQ172 and baseband processing circuitry QQ174 may be on separate chips or sets of chips, boards, or units, such as radio units and digital units. Part or all of RF transceiver circuitry QQ172 and baseband processing circuitry QQ174 may be on the same chip or set of chips, boards, or units.

Some or all of the functionality described herein as being provided by a network node, base station, eNB or other such network device may be performed by processing circuitry QQ170 executing instructions stored on device readable medium QQ180 or memory within processing circuitry QQ170. Some or all of the functionality may be provided by processing circuitry QQ170 without executing instructions stored on a separate or discrete device readable medium, such as in a hard-wired manner. Whether executing instructions stored on a device readable storage medium or not, processing circuitry QQ170 can be configured to perform the described functionality. The benefits provided by such functionality are not limited to processing circuitry QQ170 alone or to other components of network node QQ160 but are enjoyed by network node QQ160 as a whole, and/or by end users and the wireless network generally.

Device readable medium QQ180 may comprise any form of volatile or non-volatile computer readable memory comprising, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, comprising a computer program, software, an application comprising one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data obtained, e.g. received, via interface QQ190. Processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to provide and obtain, e.g. send and receive, data, for example to and from network QQ106 over a wired connection. Interface QQ190 also comprises radio front end circuitry QQ192 that may be coupled to, or be a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be provided, e.g. transmitted, via antenna QQ162. Similarly, when receiving data, antenna QQ162 may collect radio signals which are then converted into digital data by radio front end circuitry QQ192. The digital data may be passed to processing circuitry QQ170. The interface may comprise different components and/or different combinations of components.

The network node QQ160 may not comprise separate radio front end circuitry QQ192, instead, processing circuitry QQ170 may comprise radio front end circuitry and may be connected to antenna QQ162 without separate radio front end circuitry QQ192. All or some of RF transceiver circuitry QQ172 may be considered a part of interface QQ190. Interface QQ190 may comprise one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may comprise one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. Antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. The use of more than one antenna may be referred to as MIMO. Antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components, e.g., at a voltage and current level needed for each respective component. Power source QQ186 may either be comprised in, or external to, power circuitry QQ187 and/or network node QQ160. For example, network node QQ160 may be connectable to an external power source, e.g., an electricity outlet, via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Network node QQ160 may comprise additional components beyond those shown in FIG. 12 that may be responsible for providing certain aspects of the network node's functionality, comprising any of the functionality described herein and/or any functionality necessary to support the subject matter described herein. Network node QQ160 may comprise user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. A WD may be configured to transmit and/or receive information without direct human interaction. For instance, a WD may be designed to transmit information to a network on a predetermined schedule, when triggered by an internal or external event, or in response to requests from the network. Examples of a WD comprise, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. The WD may be a UE implementing the 3GPP narrow band internet of things (NB-IoT) standard. Examples of such machines or devices are sensors, metering devices such as power meters, industrial machinery, or home or personal appliances, e.g. refrigerators, televisions, etc., personal wearables, e.g., watches, fitness trackers, etc. In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. A WD as described above may be mobile, in which case it may also be referred to as a mobile device or a mobile terminal.

As illustrated, wireless device QQ110 comprises antenna QQ111, interface QQ114, processing circuitry QQ120, device readable medium QQ130, user interface equipment QQ132, auxiliary equipment QQ134, power source QQ136 and power circuitry QQ137. WD QQ110 may comprise multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may comprise one or more antennas or antenna arrays, configured to send and/or receive wireless signals, and is connected to interface QQ114. Antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. Radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120 and is configured to condition signals communicated between antenna QQ111 and processing circuitry QQ120. Radio front end circuitry QQ112 may be coupled to or a part of antenna QQ111. WD QQ110 may not comprise separate radio front end circuitry QQ112; rather, processing circuitry QQ120 may comprise radio front end circuitry and may be connected to antenna QQ111. Some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. The interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may comprise providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 comprises one or more of RF transceiver circuitry QQ122, baseband processing circuitry QQ124, and application processing circuitry QQ126. The processing circuitry may comprise different components and/or different combinations of components. Processing circuitry QQ120 of WD QQ110 may comprise a SOC. RF transceiver circuitry QQ122, baseband processing circuitry QQ124, and application processing circuitry QQ126 may be on separate chips or sets of chips. Part or all of baseband processing circuitry QQ124 and application processing circuitry QQ126 may be combined into one chip or set of chips, and RF transceiver circuitry QQ122 may be on a separate chip or set of chips. Part or all of RF transceiver circuitry QQ122 and baseband processing circuitry QQ124 may be on the same chip or set of chips, and application processing circuitry QQ126 may be on a separate chip or set of chips. Part or all of RF transceiver circuitry QQ122, baseband processing circuitry QQ124, and application processing circuitry QQ126 may be combined in the same chip or set of chips. RF transceiver circuitry QQ122 may be a part of interface QQ114. RF transceiver circuitry QQ122 may condition RF signals for processing circuitry QQ120.

Some or all of the functionality described herein as being performed by a WD may be provided by processing circuitry QQ120 executing instructions stored on device readable medium QQ130, which may be a computer-readable storage medium. Some or all of the functionality may be provided by processing circuitry QQ120 without executing instructions stored on a separate or discrete device readable storage medium, such as in a hard-wired manner. Whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations, e.g., certain obtaining operations) described herein as being performed by a WD. These operations, as performed by processing circuitry QQ120, may comprise processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application comprising one or more of logic, rules, code, tables, etc. and/or other instructions capable of being executed by processing circuitry QQ120. Device readable medium QQ130 may comprise computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. Processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110.

For example, if WD QQ110 is a smart phone, the interaction may be via a touch screen; if WD QQ110 is a smart meter, the interaction may be through a screen that provides usage, e.g., the number of gallons used) or a speaker that provides an audible alert, e.g., if smoke is detected. User interface equipment QQ132 may comprise input interfaces, devices and circuits, and output interfaces, devices and circuits. User interface equipment QQ132 is configured to allow input of information into WD QQ110 and is connected to processing circuitry QQ120 to allow processing circuitry QQ120 to process the input information. User interface equipment QQ132 may comprise, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may comprise, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary.

Power source QQ136 may be in the form of a battery or battery pack. Other types of power sources, such as an external power source, e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may comprise power management circuitry. Power circuitry QQ137 may additionally or alternatively be operable to receive power from an external power source; in which case WD QQ110 may be connectable to the external power source, such as an electricity outlet, via input circuitry or an interface such as an electrical power cable. Power circuitry QQ137 may be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 13:
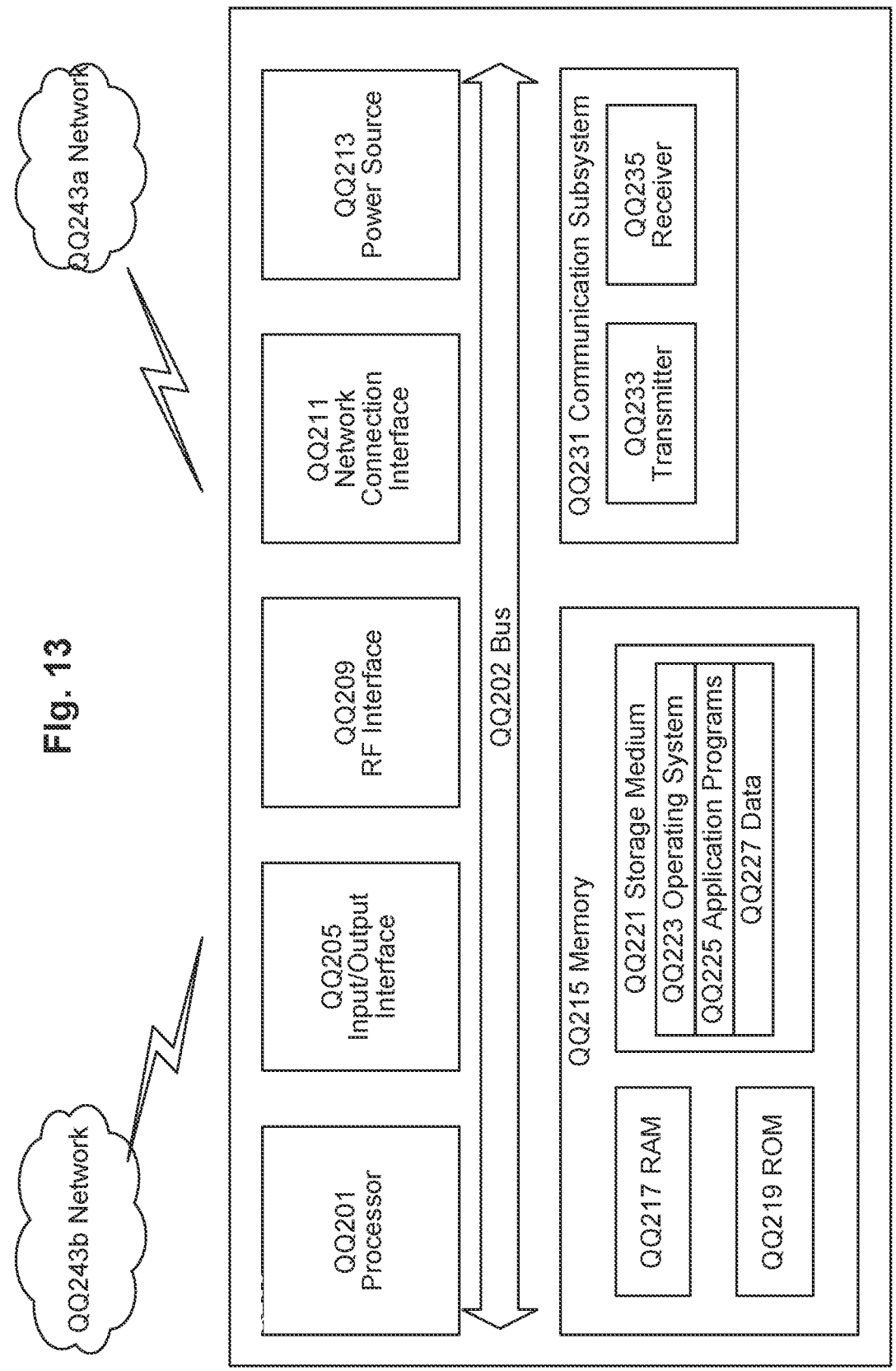
FIG. 13 is a block diagram of a communication device.

FIG. 13 illustrates a communication device 100, also referred to as a UE. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user, e.g., a smart sprinkler controller. Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), comprising a NB-IoT UE, a machine type communication (MTC) UE, and/or an enhanced MTC (eMTC) UE. UE QQ200, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE QQ200 comprises processing circuitry QQ201 that is operatively coupled to input/output interface QQ205, radio frequency (RF) interface QQ209, network connection interface QQ211, memory QQ215 comprising random access memory (RAM) QQ217, read-only memory (ROM) QQ219, and storage medium QQ221 or the like, communication subsystem QQ231, power source QQ233, and/or any other component, or any combination thereof. Storage medium QQ221 comprises operating system QQ223, application program QQ225, and data QQ227. Storage medium QQ221 may comprise other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines, e.g., in discrete logic, FPGA, ASIC, etc.; programmable logic together with appropriate firmware; one or more stored program, general-purpose processors, such as a microprocessor or Digital Signal Processor (DSP), together with appropriate software; or any combination of the above. For example, the processing circuitry QQ201 may comprise two central processing units (CPUs). Data may be information in a form suitable for use by a computer.

Input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may comprise a touch-sensitive or presence-sensitive display, a camera, e.g., a digital camera, a digital video camera, a web camera, etc., a microphone, a sensor, a mouse, a trackball, a directional pad, a trackpad, a scroll wheel, a smartcard, and the like. The presence-sensitive display may comprise a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to comprise a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links, e.g., optical, electrical, and the like. The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to comprise memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. Storage medium QQ221 may be configured to comprise operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to comprise a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243b using communication subsystem QQ231. Network QQ243a and network QQ243b may be the same network or networks or different network or networks. Communication subsystem QQ231 may be configured to comprise one or more transceivers used to communicate with network QQ243b. For example, communication subsystem QQ231 may be configured to comprise one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may comprise transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

The communication functions of communication subsystem QQ231 may comprise data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may comprise cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to comprise any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 14:
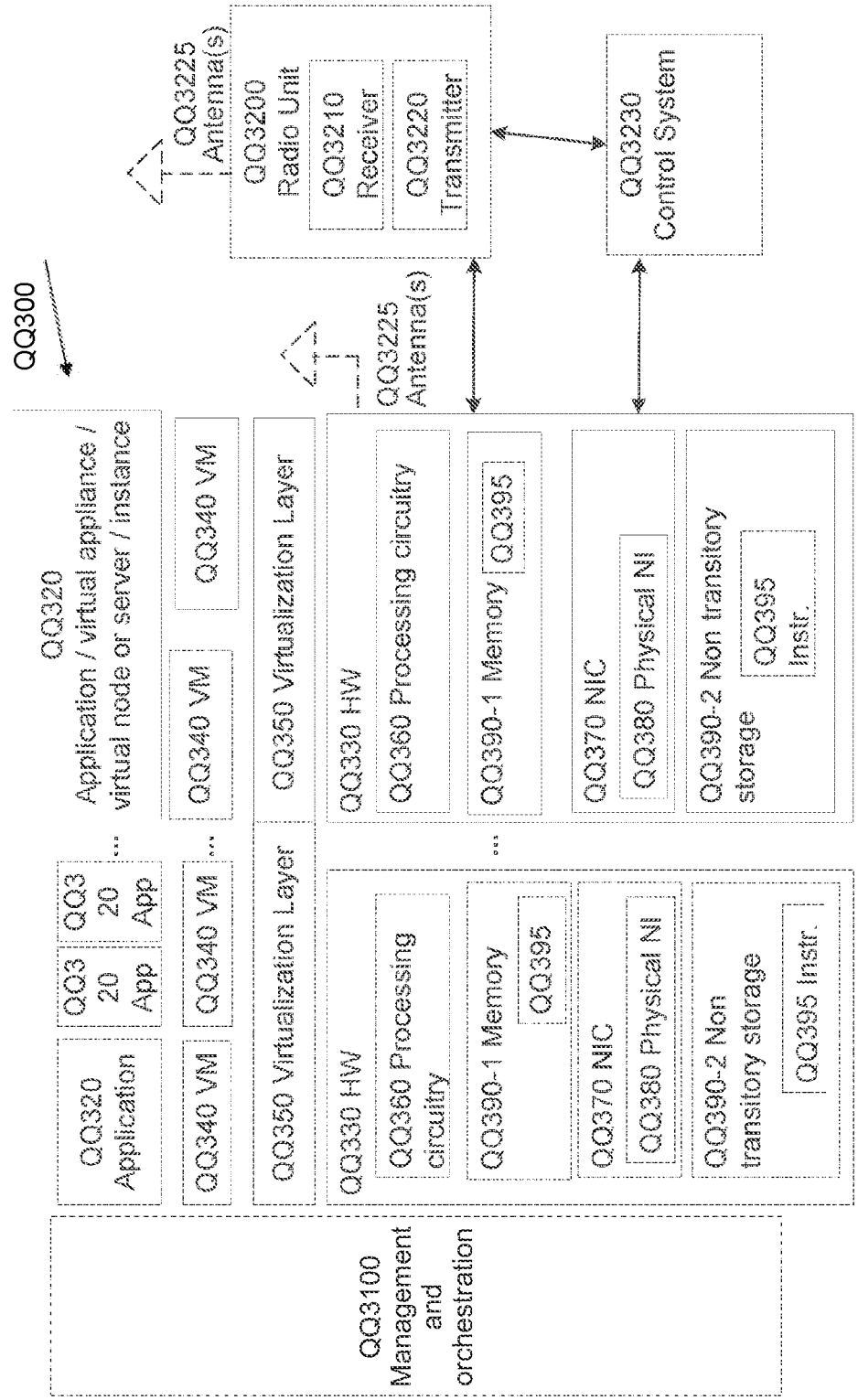
FIG. 14 is a block diagram of a virtualization environment.

FIG. 14 is a schematic block diagram illustrating a virtualization environment QQ300 in which functions may be virtualized. In the present context, virtualizing means creating virtual versions of apparatuses or devices which may comprise virtualizing hardware platforms, storage devices and networking resources. As used herein, virtualization can be applied to a node, e.g., a virtualized base station or a virtualized access node, or to a device, e.g., a UE, a wireless device or any other type of communication device, or components thereof and relates to an implementation in which at least a portion of the functionality is implemented as one or more virtual components, e.g., via one or more applications, components, functions, virtual machines or containers executing on one or more physical processing nodes in one or more networks.

Some or all of the functions described herein may be implemented as virtual components executed by one or more virtual machines implemented in one or more virtual environments QQ300 hosted by one or more of hardware nodes QQ330. If the virtual node is not an access node or does not require radio connectivity, e.g., a core network node, then the network node may be entirely virtualized.

The functions may be implemented by one or more applications QQ320, which may alternatively be called software instances, virtual appliances, network functions, virtual nodes, virtual network functions, etc., operative to implement some of the features, functions, and/or benefits disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry comprising digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which comprise physical network interface QQ380. Each hardware device may also comprise non-transitory, persistent, machine-readable storage media QQ390-2 having stored therein software QQ395 and/or instructions executable by processing circuitry QQ360. Software QQ395 may comprise any type of software comprising software for instantiating one or more virtualization layers QQ350 (also referred to as hypervisors), software to execute virtual machines QQ340 as well as software allowing it to execute functions, features and/or benefits described in relation with others.

Virtual machines QQ340, comprise virtual processing, virtual memory, virtual networking or interface and virtual storage, and may be run by a corresponding virtualization layer QQ350 or hypervisor. Different instances of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 14, hardware QQ330 may be a standalone network node with generic or specific components. Hardware QQ330 may comprise antenna QQ3225 and may implement some functions via virtualization. Alternatively, hardware QQ330 may be part of a larger cluster of hardware, e.g. such as in a data center or customer premise equipment (CPE) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 14.

One or more radio units QQ3200 that each comprise one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as an access node 300 or a base station.

Some signalling can be affected with the use of control system QQ3230 which may alternatively be used for communication between the hardware nodes QQ330 and radio units QQ3200.

Figure 15:
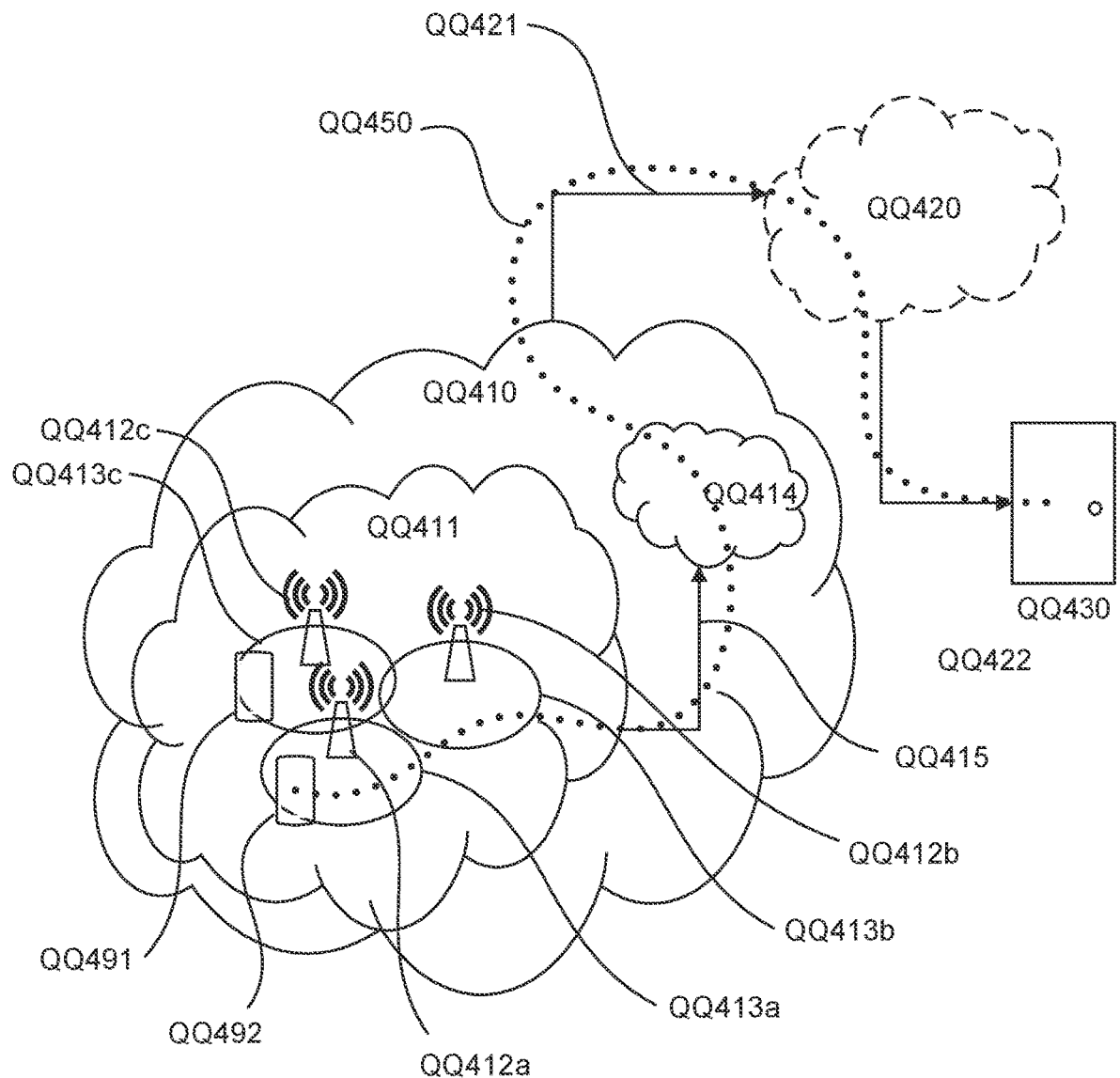
FIG. 15 is a block diagram of a telecommunication network connected via an intermediate network to a host computer.

With reference to FIG. 15 a communication system comprises telecommunication network QQ410, such as a 3GPP-type cellular network, which comprises access network QQ411, such as an access network 320, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated, they are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

The UE, base station and host computer discussed in the preceding paragraphs will now be described with reference to FIG. 16. In communication system QQ500, host computer QQ510 comprises hardware QQ515 comprising communication interface QQ516 configured to set up and maintain a wired or wireless connection with an interface of a different communication device of communication system QQ500. Host computer QQ510 further comprises processing circuitry QQ518, which may have storage and/or processing capabilities. Processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 comprises host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further comprises base station QQ520 provided in a telecommunication system and comprising hardware QQ525 enabling it to communicate with host computer QQ510 and with UE QQ530. Hardware QQ525 may comprise communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520.

Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. Hardware QQ525 of base station QQ520 further comprises processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further comprises UE QQ530 already referred to. It's hardware QQ535 may comprise radio interface QQ537 configured to set up and maintain wireless connection QQ570 with a base station serving a coverage area in which UE QQ530 is currently located. Hardware QQ535 of UE QQ530 further comprises processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 comprises client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 16:
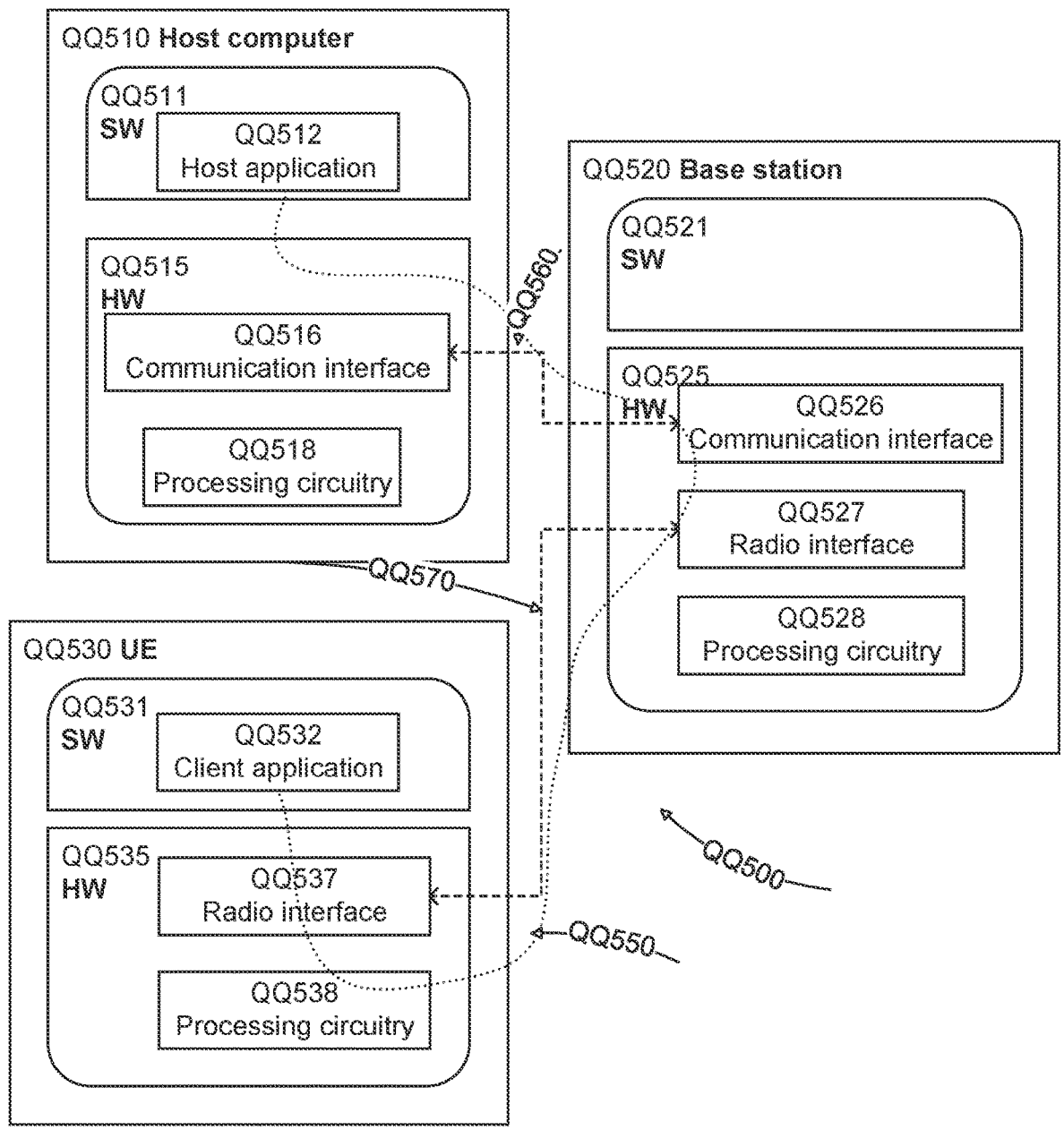
FIG. 16 is a block diagram of a host computer communicating via a base station with a UE over a partially wireless connection.

It is noted that host computer QQ510, base station QQ520 and UE QQ530 illustrated in FIG. 16 may be similar or identical to host computer QQ430, one of base stations QQ412a, QQ412b, QQ412c and one of UEs QQ491, QQ492 of FIG. 15, respectively. This is to say, the inner workings of these entities may be as shown in FIG. 15 and independently, the surrounding network topology may be that of FIG. 15.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing, e.g., on the basis of load balancing consideration or reconfiguration of the network.

Wireless connection QQ570 between UE QQ530 and base station QQ520 described throughout this disclosure. The performance of OTT services provided to UE QQ530 using OTT connection QQ550 may be improved, in which wireless connection QQ570 forms the last segment. More precisely, the present disclosure may improve the deblock filtering for video processing and thereby provide benefits such as improved video encoding and/or decoding.

A measurement procedure may be provided for the purpose of monitoring data rate, latency and other factors on which the present disclosure improves. There may be further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. Sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may comprise message format, retransmission settings, preferred routing etc.; the reconfiguring need not affect base station QQ520, and it may be unknown or imperceptible to base station QQ520. Such procedures and functionalities may be known and practiced in the art. Measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 17:
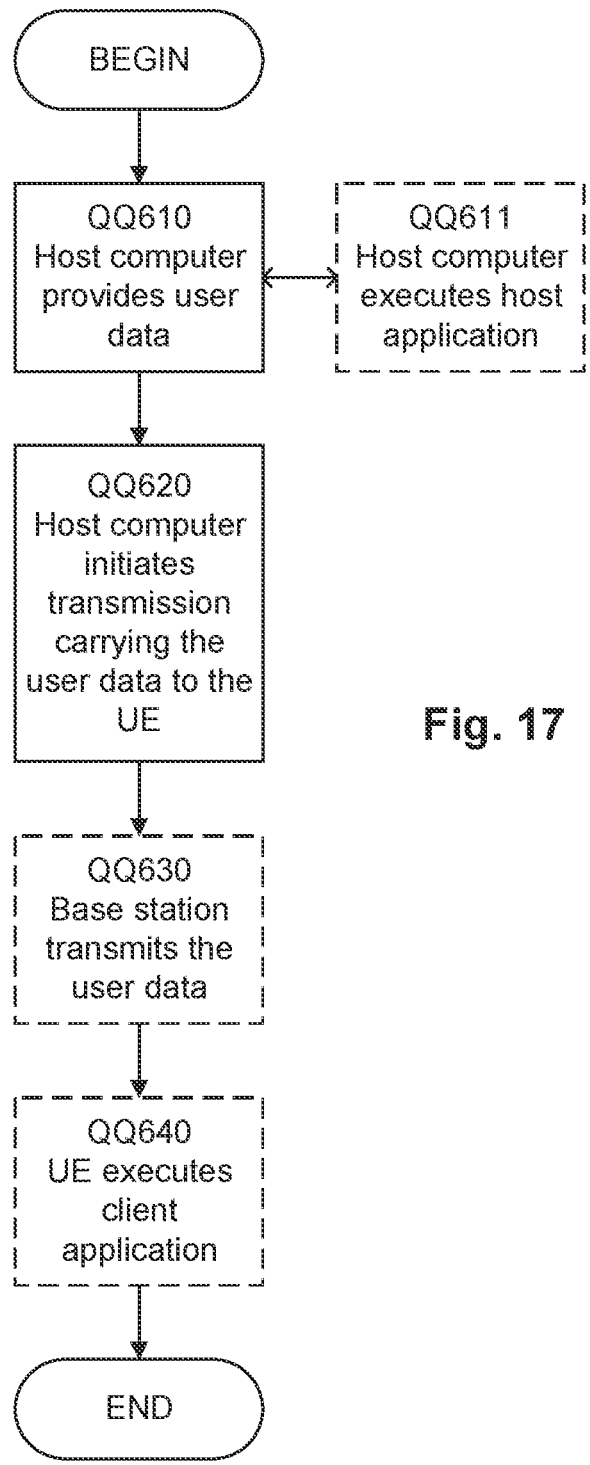
FIG. 17 is a block diagram of methods implemented in a communication system comprising a host computer, a base station, and a UE.

FIG. 17 is a flowchart illustrating a method implemented in a communication system. The communication system comprises a host computer, a base station and a UE which may be those described with reference to FIG. 15 and FIG. 16. For simplicity of the present disclosure, only drawing references to FIG. 17 will be comprised in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated. In step QQ640 (which may also be optional), the UE executes a client application associated with the host application executed by the host computer.

Figure 18:
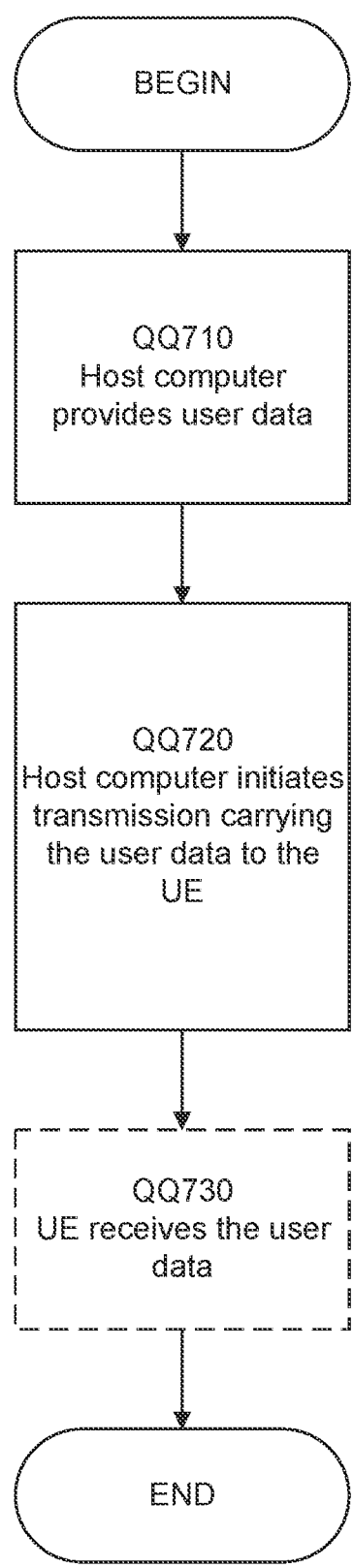
FIG. 18 is a block diagram of methods implemented in a communication system comprising a host computer, a base station, and a UE.

FIG. 18 is a flowchart illustrating a method implemented in a communication system. The communication system comprises a host computer, a base station and a UE which may be those described with reference to FIG. 15 and FIG. 16. For simplicity of the present disclosure, only drawing references to FIG. 18 will be comprised in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station. In step QQ730 (which may be optional), the UE receives the user data carried in the transmission.

Figure 19:
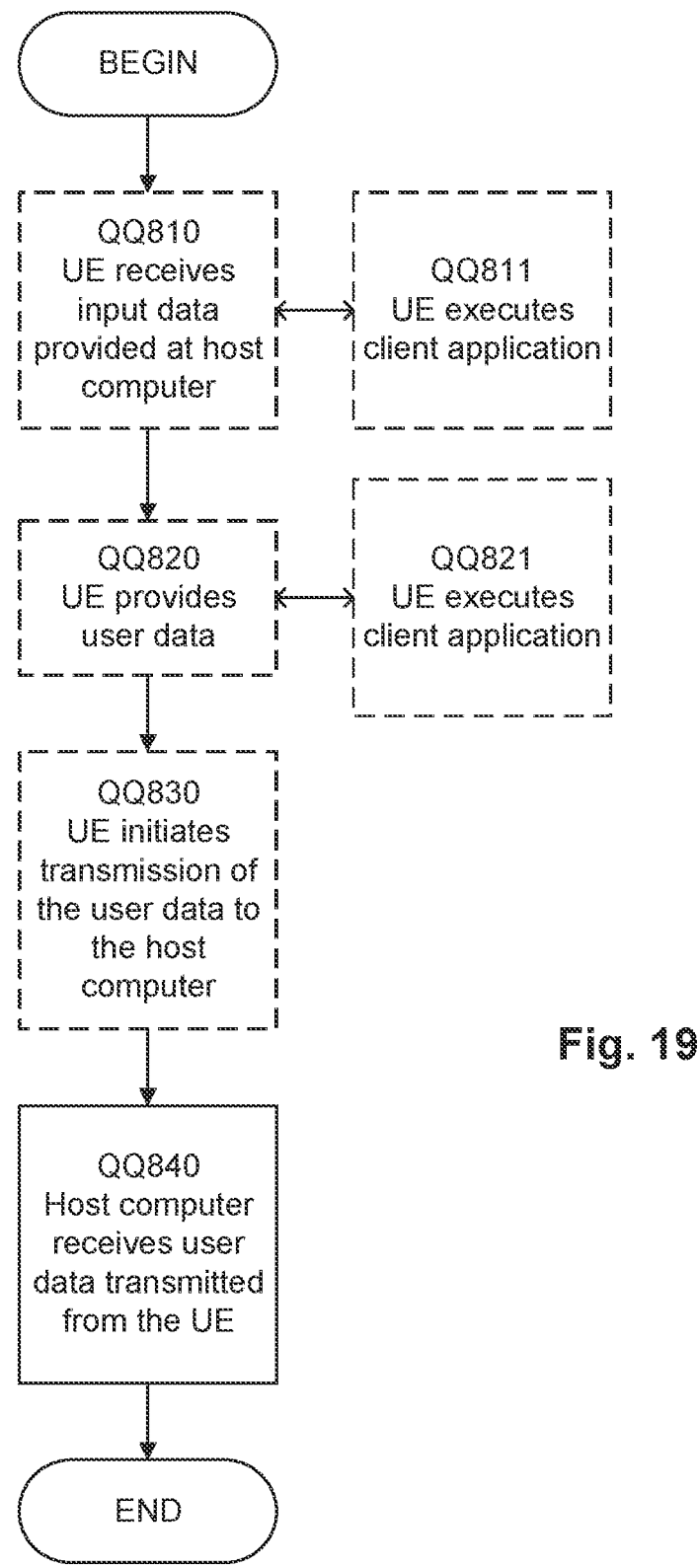
FIG. 19 is a block diagram of methods implemented in a communication system comprising a host computer, a base station, and a UE.

FIG. 19 is a flowchart illustrating a method implemented in a communication system. The communication system comprises a host computer, a base station and a UE which may be those described with reference to FIG. 15 and FIG. 16. For simplicity of the present disclosure, only drawing references to FIG. 19 will be comprised in this section. In step QQ810 (which may be optional), the UE receives input data provided by the host computer. Additionally, or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data provided, e.g. transmitted, from the UE.

Figure 20:
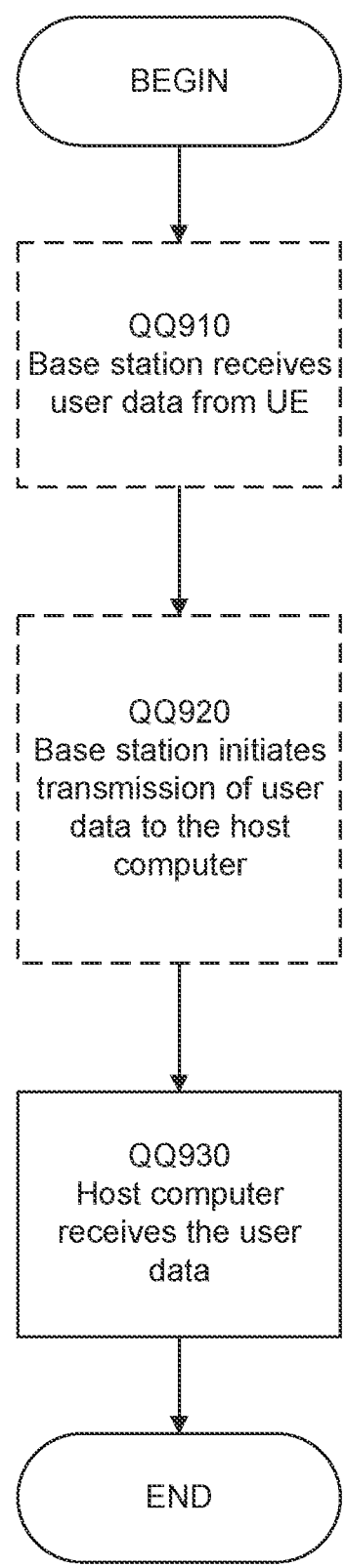
FIG. 20 is a block diagram of methods implemented in a communication system comprising a host computer, a base station, and a UE.

FIG. 20 is a flowchart illustrating a method implemented in a communication system. The communication system comprises a host computer, a base station and a UE which may be those described with reference to FIG. 15 and FIG. 16. For simplicity of the present disclosure, only drawing references to FIG. 20 will be comprised in this section. In step QQ910 (which may be optional), the base station receives user data from the UE. In step QQ920 (which may be optional), the base station initiates transmission of the received user data to the host computer. In step QQ930 (which may be optional), the host computer receives the user data carried in the transmission initiated by the base station.

Summarized, the present disclosure enables protection for 5GS networks form DoS attacks. It provides methods for blocking the UL traffic when malicious data is being sent. 5QI values are defined that implicitly indicate the treatment that should be applied to data packets having the value, e.g. whether they should be dropped or monitored. Those 5QI values may be used by the SMF for setting the OH value, which is always sent to the communication device 100.

Accordingly, a new behavior to the QoS framework is provided that imply the discard of data packets in the communication device 100 and/or the monitoring of presumed malicious data packets in the access network 320. Both behaviors are controlled implicitly via QFI/5QI values rather than based on explicit indicators.

A OR value may be defined and used to indicate implicitly that data packets belonging to the QoS Flow shall be discarded by the communication device 100 and shall not be delivered by the system.

A standardized 5QI value may be provided that indicates the characteristic of a QoS flow for which User Plane data packets should be discarded and not be delivered by the system. Although the 5QI value is not always sent to the communication device 100 itself, since standardized 5QI values may be used as OR values according to the existing specifications, an implicit indication of discarding data packets may thus be provided to the communication device 100.

Whenever the 5GS finds it necessary, a QoS Rule is installed in the communication device 100. The rule may comprise the OR value and classifies malicious traffic so that whenever the OR value that implicitly indicates that data packets should be discarded is used, the communication device 100 shall drop the data packets classified with that QFI. Such QFI value may be referred to herein as a Drop QFI.

A OH value, or alternatively a standardized or preconfigured 5QI, may be defined and used to implicitly indicate to the access network 320 that data packets belonging to the QoS Flow should be monitored by an access node 300 such as the access node 300 serving the communication device 100. The presence of this QFI, e.g., an Alert QFI, in a data packet indicates that the access node 300 should take appropriate actions to protect itself against malicious data packets from the communication device 100 that provided, e.g. transmitted, the data packet. For example, a communication device 100 that provides, e.g. transmits, data packets comprising the "Alert" OH may be de-prioritized by the access node 300 such that it is less likely to be served by the access node 300 in connection with RRC transitions and scheduling.

Before escalating to Discard, an intermediate QoS rule indicating a QFI value of Alert may be installed in a communication device 100, thus allowing the access node 300 to take the appropriate actions to protect itself. Whenever needed, the QoS Rule may be changed to indicate the QFI Discard.

Any access node 300 handling User Plane data packets may monitor the data packets belonging to the indicated QoS Flow ID in order to take measures as necessary.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may comprise one or more microprocessor or microcontrollers, as well as other digital hardware, which may comprise digital signal processors (DSPs), special-purpose digital logic, and the like. The processing circuitry may be configured to execute program code stored in memory, which may comprise one or several types of memory such as read-only memory (ROM), random-access memory (RAM), cache memory, flash memory devices, optical storage devices, etc. Program code stored in memory comprises program instructions for executing one or more telecommunications and/or data communications protocols as well as instructions for carrying out one or more of the techniques described herein. In some implementations, the processing circuitry may be used to cause the respective functional unit to perform corresponding functions.

The term unit may have conventional meaning in the field of electronics, electrical devices and/or electronic devices and may comprise, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a core network node for enabling handling of data packets in a wireless communication system, the core network node being comprised in a core network of the wireless communication system, the method comprising:
   identifying a potentially malicious service data flow associated with a communication device served by an access network of the wireless communication system;
   assigning, to the potentially malicious service data flow, an identifier value to an identifier, wherein the identifier value indicates that data packets associated with the potentially malicious service data flow is to be handled according to a packet handling rule for potentially malicious data packets; and
   providing an identifier comprising the identifier value towards the communication device towards at least one of:
     an access node that serves the communication device in the access n, and a second core network node that processes data packets to and from the communication device, wherein the identifier value indicates at least one of:
that data packets associated with the potentially malicious service data flow is to be dropped by at least one of the communication device and the access node;
that data packets associated with the potentially malicious service data flow is to be monitored within the access network;
that the communication device associated with the potentially malicious service data flow is to be deprioritized by the access node;
that network resources for the communication device associated with the potentially malicious service data flow is to be restricted by the access node; and
wherein the identifier value implicitly indicates that data packets belonging to the potentially malicious service data flow is to be dropped or monitored.

2. The method according to claim 1, wherein the identifier comprises a Quality of Service, QoS, Flow Identifier, QFI, or comprises a 5G QoS Identifier, 5QI, associated to the QFI.

3. The method according to claim 1, comprising:
generating a packet filter comprising the packet handling rule for potentially malicious data packets; and
providing the packet filter toward the communication device.

4. A core network node for enabling handling of data packets in a wireless communication system, the core network node being comprised in a core network of the wireless communication system, the core network node being configured to:
identify a potentially malicious service data flow associated with a communication device served by an access network of the wireless communication system;
assign, to the potentially malicious service data flow, an identifier value that indicates that data packets associated with the potentially malicious service data flow is to be handled according to a packet handling rule for potentially malicious data packets; and to
provide the identifier value towards the communication device, towards at least one of:
an access node that serves the communication device in the access network, and
a second core network node that processes data packets to and from the communication device,
wherein the identifier value indicates at least one of:
that data packets associated with the potentially malicious service data flow is to be dropped by at least one of the communication device and the access node;
that data packets associated with the potentially malicious service data flow is to be monitored within the access network;
that the communication device associated with the potentially malicious service data flow is to be deprioritized by the access node;
that network resources for the communication device associated with the potentially malicious service data flow is to be restricted by the access node; and
wherein the identifier value implicitly indicates that data packets belonging to the potentially malicious service data flow is to be dropped or monitored.

5. A method performed by an access node for enabling handling of data packets in a wireless communication system, the access node being comprised in an access network of the wireless communication system, the method comprising:

obtaining, from a core network node, an identifier comprising an identifier value that indicates that data packets associated with a potentially malicious service data flow is to be handled according to a packet handling rule for potentially malicious data packets;
obtaining a data packet that is marked with the identifier comprising the identifier value; and
handling the data packet according to the packet handling rule for potentially malicious data packets,
wherein the identifier value indicates at least one of:
that data packets associated with the potentially malicious service data flow is to be dropped by at least one of the communication device and the access node;
that data packets associated with the potentially malicious service data flow is to be monitored within the access network;
that the communication device associated with the potentially malicious service data flow is to be deprioritized by the access node;
that network resources for the communication device associated with the potentially malicious service data flow is to be restricted by the access node; and
wherein the identifier value implicitly indicates that data packets belonging to the potentially malicious service data flow is to be dropped or monitored.

6. The method according to claim 5, wherein the identifier comprises a Quality of Service, QoS, Flow Identifier, QFI, or comprises a 5G QoS Identifier, 5QI, associated to the QFI.

7. An access node for enabling handling of data packets in a wireless communication system, the access node being comprised in an access network of the wireless communication system, the access node being configured to:
obtain, from a core network node, an identifier value that indicates that data packets associated with a potentially malicious service data flow is to be handled according to a packet handling rule for potentially malicious data packets;
obtain a data packet that is marked with the identifier value; and to
handle the data packet according to the packet handling rule, wherein the identifier value indicates at least one of:
that data packets associated with the potentially malicious service data flow is to be dropped by at least one of the communication device and the access node;
that data packets associated with the potentially malicious service data flow is to be monitored within the access network;
that the communication device associated with the potentially malicious service data flow is to be deprioritized by the access node;
that network resources for the communication device associated with the potentially malicious service data flow is to be restricted by the access node; and
wherein the identifier value implicitly indicates that data packets belonging to the potentially malicious service data flow is to be dropped or monitored.

8. A method performed by a communication device for enabling handling of data packets in a wireless communication system, the communication device being comprised in the wireless communication system and being served by a radio access network of the wireless communication system, the method comprising:
obtaining an identifier comprising an identifier value that indicates that data packets associated with a potentially malicious service data flow is to be handled according to a packet handling rule for potentially malicious data packets;

obtaining a data packet for uplink transmission;

determining that the data packet belongs to the potentially malicious service data flow; and handling the data packet according to the packet handling rule for potentially malicious data packets, wherein the identifier value indicates at least one of:
that data packets associated with the potentially malicious service data flow is to be dropped by at least one of the communication device and the access node;
that data packets associated with the potentially malicious service data flow is to be monitored within the access network;
that the communication device associated with the potentially malicious service data flow is to be deprioritized by the access node;
that network resources for the communication device associated with the potentially malicious service data flow is to be restricted by the access node; and
wherein the identifier value implicitly indicates that data packets belonging to the potentially malicious service data flow is to be dropped or monitored.

9. The method according to claim 8, comprising:
obtaining a packet filter from the core network node, wherein the packet filter comprises the packet handling rule, wherein the identifier value indicates that the data packet associated with the potential malicious service data flow is to be handled by being dropped by the communication device or monitored within an access node.

10. The method according to claim 8, wherein the handling the data packet comprises:
dropping the data packet without providing the data packet to an access node when the packet handling ruled indicates dropping.

11. The method according to claim 8, wherein the identifier comprises a Quality of Service, QoS, Flow Identifier, QFI, or comprises a 5G QoS Identifier, 5QI, associated to the QFI.

12. A communication device for enabling handling of data packets in a wireless communication system, the communication device being comprised in the wireless communication system, the communication device being configured to:
obtain an identifier comprising an identifier value that indicates that data packets associated with a potentially malicious service data flow is to be handled according to a packet handling rule for potentially malicious data packets;
obtain a data packet for uplink transmission;
determine that the data packet belongs to the potentially malicious service data flow; and to
handle the data packet according to the packet handling rule for potentially malicious data packets, wherein the identifier value indicates at least one of:
that data packets associated with the potentially malicious service data flow is to be dropped by at least one of the communication device and the access node;
that data packets associated with the potentially malicious service data flow is to be monitored within the access network;
that the communication device associated with the potentially malicious service data flow is to be deprioritized by the access node;
that network resources for the communication device associated with the potentially malicious service data flow is to be restricted by the access node; and
wherein the identifier value implicitly indicates that data packets belonging to the potentially malicious service data flow is to be dropped or monitored.

13. A computer program product comprising a non-transitory computer readable medium storing instructions which, when executed on at least one processor, cause the at least one processor to:
identify a potentially malicious service data flow associated with a communication device served by an access network of the wireless communication system;
assign, to the potentially malicious service data flow, an identifier value to an identifier, wherein the identifier value indicates that data packets associated with the potentially malicious service data flow is to be handled according to a packet handling rule for potentially malicious data packets; and
provide an identifier comprising the identifier value towards the communication device towards at least one of:
an access node that serves the communication device in the access network, and
a second core network node that processes data packets to and from the communication device, wherein the identifier value indicates at least one of:
that data packets associated with the potentially malicious service data flow is to be dropped by at least one of the communication device and the access node;
that data packets associated with the potentially malicious service data flow is to be monitored within the access network;
that the communication device associated with the potentially malicious service data flow is to be deprioritized by the access node;
that network resources for the communication device associated with the potentially malicious service data flow is to be restricted by the access node; and
wherein the identifier value implicitly indicates that data packets belonging to the potentially malicious service data flow is to be dropped or monitored.

\* \* \* \* \*